United States Patent
Deb et al.

(10) Patent No.: US 10,601,712 B1
(45) Date of Patent: Mar. 24, 2020

(54) SYSTEM FOR PERFORMING A VARIATION CONTROL IN A DATA NETWORK

(71) Applicant: Bank of America Corporation, Charlotte, NC (US)

(72) Inventors: Amitava Deb, Hong Kong (CN); Sandip Gopal Bhatwadekar, Hong Kong (CN); Chih-Chin Yang, Hong Kong (CN); Jovan Cenev, Hong Kong (CN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 7 days.

(21) Appl. No.: 16/156,915

(22) Filed: Oct. 10, 2018

(51) Int. Cl.
*H04L 12/801* (2013.01)
*G06F 17/18* (2006.01)
*G06F 16/907* (2019.01)
*G06F 16/23* (2019.01)

(52) U.S. Cl.
CPC .......... *H04L 47/10* (2013.01); *G06F 16/2365* (2019.01); *G06F 16/907* (2019.01); *G06F 17/18* (2013.01)

(58) Field of Classification Search
CPC ... H04L 47/10; G06F 16/907; G06F 16/2365; G06F 17/18
See application file for complete search history.

(56) References Cited

U.S. PATENT DOCUMENTS

| | | |
|---|---|---|
| 6,343,295 B1 | 1/2002 | MacLeod et al. |
| 6,434,558 B1 | 8/2002 | MacLeod et al. |
| 8,166,048 B2 | 4/2012 | Wong et al. |
| 8,983,914 B2 | 3/2015 | Kung et al. |
| 9,075,860 B2 | 7/2015 | Kozina et al. |
| 9,185,095 B1* | 11/2015 | Moritz .................. H04L 63/102 |
| 9,348,879 B2 | 5/2016 | Mohammad et al. |
| 9,384,231 B2 | 7/2016 | Benjamin et al. |
| 9,659,042 B2 | 5/2017 | Puri et al. |
| 2013/0080197 A1* | 3/2013 | Kung ..................... G06Q 10/10 705/7.11 |

OTHER PUBLICATIONS

Deb, A., et al., "System for Generating Dataflow Lineage Information in a Data Network," U.S. Appl. No. 16/156,688, Oct. 10, 2018, 62 pages.
Deb, A., et al., "System for Performing a Lineage Control in a Data Network," U.S. Appl. No. 16/156,759, Oct. 10, 2018, 59 pages.
Deb, A., et al., "System for Performing an Integrated Data Quality Control in a Data Network," U.S. Appl. No. 16/156,819, Oct. 10, 2018, 62 pages.
Deb, A., et al., "System for Performing a Timeliness Control in a Data Network," U.S. Appl. No. 16/156,878, Oct. 10, 2018, 61 pages.

* cited by examiner

*Primary Examiner* — Siming Liu
(74) *Attorney, Agent, or Firm* — Michael A. Springs

(57) ABSTRACT

A system for performing a variation control in a data network is disclosed. The system generates a distribution graph for a set of node values associated with a network node. The system determines a statistical confidence level for the distribution graph and determines a statistical confidence interval for the distribution graph based on the statistical confidence level. Then, the system receives a new node value associated with the network node and compares the new node value to the statistical confidence interval. If the new node value falls within the statistical confidence interval, the system determines that determining that the new node value is normal.

20 Claims, 17 Drawing Sheets

| Node ID 302 | Node value 304 | Timestamp 306 | Lineage control value 308 |
|---|---|---|---|
| 987885 | Node value 1 | 2017.02.12T20:15:14 | Fef354 |
| 896948 | Node value 2 | 2017.02.12T19:05:17 | S2und |
| 489595 | Node value 3 | 2017.02.12T20:15:15 | Feu#& |
| ... | ... | ... | ... |

| Computation name 402 | Version value 404 | Timestamp 406 | Version control value 408 |
|---|---|---|---|
| REPORT | 1.00.05 | 2018.02.05T16:35:25 | Y64y6544y54 |
| REPORT | 0.98.60 | 2018.01.15T13:15:25 | G7rga2r7t55 |
| REPORT | 0.75.50 | 2017.12.05T11:15:00 | Gr884gfr56f |
| ... | ... | ... | ... |

SYSTEM FOR PERFORMING A VARIATION CONTROL IN A DATA NETWORK

TECHNICAL FIELD

This disclosure relates generally to dataflow and data quality control, and more particularly to a system for performing a variation control in a data network.

BACKGROUND

In the digital era, data has become one of the most critical components of an enterprise. As the volume of data is growing exponentially and data breaches are happening more frequently than ever before, detecting and preventing data loss and controlling data quality has become one of the most pressing security concerns for enterprises.

It is challenging for enterprises to detect data anomaly, protect data against information leakage, and control the data quality in the era of big data. As data becomes one of the most critical components of an enterprise, managing and analyzing large amounts of data provides an enormous competitive advantage for enterprises. However, it also puts sensitive and valuable enterprise data at risk of loss or theft and poses significant security challenges to enterprises. The need to store, process, and analyze more and more data together with the high utilization of modern communication channels in enterprises results in an increase of possible data corruption vectors, including cloud file sharing, email, web pages, instant messaging, FTP (file transfer protocol), removable media/storage, database/file system vulnerability, and social networks.

Data quality control faces the following technical challenges. (1) Completeness: completeness of data refers to whether data has flown correctly through the necessary elements of the IT infrastructure, whether all inputs and transformations happened correctly as prescribed and intended, and whether specific dataflow has been consistently flowing the same path every period the data is delivered. (2) Timeliness: timeliness of data refers to the latency between each transformation in the dataflow and the correct delivery of data at point of receipt according to the pre-specified delivery time. (3) Accuracy: accuracy refers to correct value of data received at the end. Accuracy issues are usually caused by corrupt data in the inputs, or by bugs in data transformation algorithms.

Large organizations usually have a complex network of systems. Over time the systems become so complex that data integrity and quality becomes a huge concern. As data goes through many transformation processes, it is very difficult to backtrack or validate any data coming out in the output stage. Therefore, it is important to develop an IT framework that preserves the quality and integrity of its data residing in various databases across systems and departments.

SUMMARY

To mitigate data quality/integrity issues, large organizations spend a lot of time and computing resources doing manual reconciliation in different nodes and validating output numbers. The absence of automated data lineage and efficient data integrity/quality assurance methods has been very expensive to big organizations.

For large corporations lacking the efficient and normalized data representation in their authorized data sources, it is important to develop an IT framework that guarantees the quality and integrity of its data residing in various databases across systems and departments. Manual control operations and reconciliations among databases are not the most practical approach and not an efficient solution in time-sensitive data processing. With the existence of legacy technologies and diverse IT systems architecture, an intelligent support system architecture that aims to guarantee the integrity, flow control and quality of data (within a confidence level) in the organization is disclosed according to the present disclosure.

The present disclosure discloses a dataflow control architecture/framework that puts the lineage information in the data itself in form of a control value instead of keeping it in the systems only. The disclosed dataflow control architecture proposes that all the tables (or objects or object-oriented databases, etc.) of all databases within the IT architecture will extend by one column (or object field/variable, etc.) to accommodate for a data-quality metadata referred to as control value (e.g., a lineage control value or a version control value). The control values applies to all rows/objects in all databases, and may be generated by a mutable transformation function (or other transformation function of fixed or variable length with alphanumeric output) from input, for example such as data values held in the row, location of the database, timestamp when the data was populated, and origin of the data point in the row in a form of another control value.

The generation of the control values (e.g., lineage control values) in the databases can be done in-place for every database looping through all data in the databases defined in a lineage server. The same logic is used for generation of control value (e.g., version control value) for the data transformation algorithms used in the IT infrastructure, except that instead of data values in the object/table a transformation function of the algorithm details is used. The challenge in implementing this logic in legacy systems with legacy algorithms is that it may require a drastic change of the code or the software implementation to be able to attach a control value to the generated output.

In the present disclosure, the control values are aggregated as data flows through the nodes of systems comprising multiple data storage nodes and computation nodes. A lineage server scans all the control values of all elements in the IT infrastructure and infers a dataflow graph. The lineage server subsequently loops through all the dataflow graphs recorded and connects all distinct dataflows by creating trees of graphs (by connecting nodes of intersection) to infer a map of the entire IT infrastructure. In one embodiment, the disclosed system receives one or more input data elements and determines a dataflow path for the one or more input data elements. The dataflow path includes at least a first data storage node and a first computation node. Then, the system identifies a lineage control value associated with the first storage node and associates the first lineage control value to the one or more input data elements. Furthermore, the system identifies a version control value associated with the first computation node and associates the version control value to the one or more input data elements. Next, the system generates an output lineage for the one or more input data elements by appending the lineage control value to the version control value. The system may further generate a dataflow graph based on the output lineage.

When the lineage server completes the discovery of the IT infrastructure by aggregating the control values, the real time daily dataflow graph can be used for performing a lineage control. The dataflow control architecture ensures tracking of data as it passes through the IT infrastructure, maintains real time map of all elements, optimizes for normalized data storage and ensures the integrity of the architecture. When the data comes in the storage location it populates the values and the appropriate control values as well. The lineage server loops through the data and checks control values to see if the dataflow for the values have been correctly flowed through the system and whether all the transformations have occurred as expected. If the dataflow has low probability of occurrence it is flagged as an exception and the data is considered potentially flawed.

Furthermore, the lineage server keeps a historical record of timestamps for all nodes of all dataflows for performing a timeliness control. In many cases data can arrive at the storage location with the correct dataflow according to expectation by the lineage server, however there might be significant delay between data transformations that can disrupt the synchronization of the system. Dataflow timestamps contained in the control values may also indicate inputs that lack updates, which in effect causes stale inputs into the data transformation algorithms causing faulty outputs. The lineage server therefore flags any abnormal latencies in the dataflow.

Moreover, a probabilistic examination of historical data values for performing a variation control and ensuring data accuracy is also disclosed in the present disclosure. An equidistant historical time series (depending on the frequency of occurrence) of data values are created and their probability distribution functions (PDFs) are observed based on frequency approach. The PDFs are the univariate histograms of values of data point, change in values (i.e. first derivative) and change of changes in values (i.e. second derivative). For each of these 3 PDFs, joint or univariate histograms are created for determining whether the latest data point is in the tails or an outlier of the concentration. If the data point value is an observed outlier, it is flagged as a potential data quality exception.

As such, the system as disclosed in the present disclosure presents a dataflow control architecture and a quality control architecture to improve the integrity of the data and databases in the system and track data as it flows through an enterprise's IT infrastructure in real time. For example, as data flows through a dataflow path including multiple network nodes the system aggregates the lineage information associated with each of the network nodes and generates an output lineage representing a summary of the path the data passes through. The lineage information can be used to generate dataflow graphs for further data analytics, for example such as lineage control analysis, timeliness control analysis, and variation control analysis. Such analysis helps identifying potentially data corruptions in the network. Data corruptions in the network, for example such as data corruptions in one or more network nodes in the network, may indicate a software or hardware vulnerability in the network nodes, which may further lead to network issues, such as creating a network bottleneck. In the present disclosure, the lineage information can be used for analyzing latencies between any pair of the network nodes and variation of the node values in a network node to determine a data quality and corruption in a network node. This further facilitates identifying network nodes that are potentially out-of-compliance (e.g., a software or hardware vulnerability), thereby improving the performance of the network and alleviating the network bottleneck.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 3 illustrates an exemplary embodiment of a node table, according to the present disclosure;

FIG. 4 illustrates an exemplary embodiment of a version control table, according to the present disclosure;

DETAILED DESCRIPTION

Figure 1:
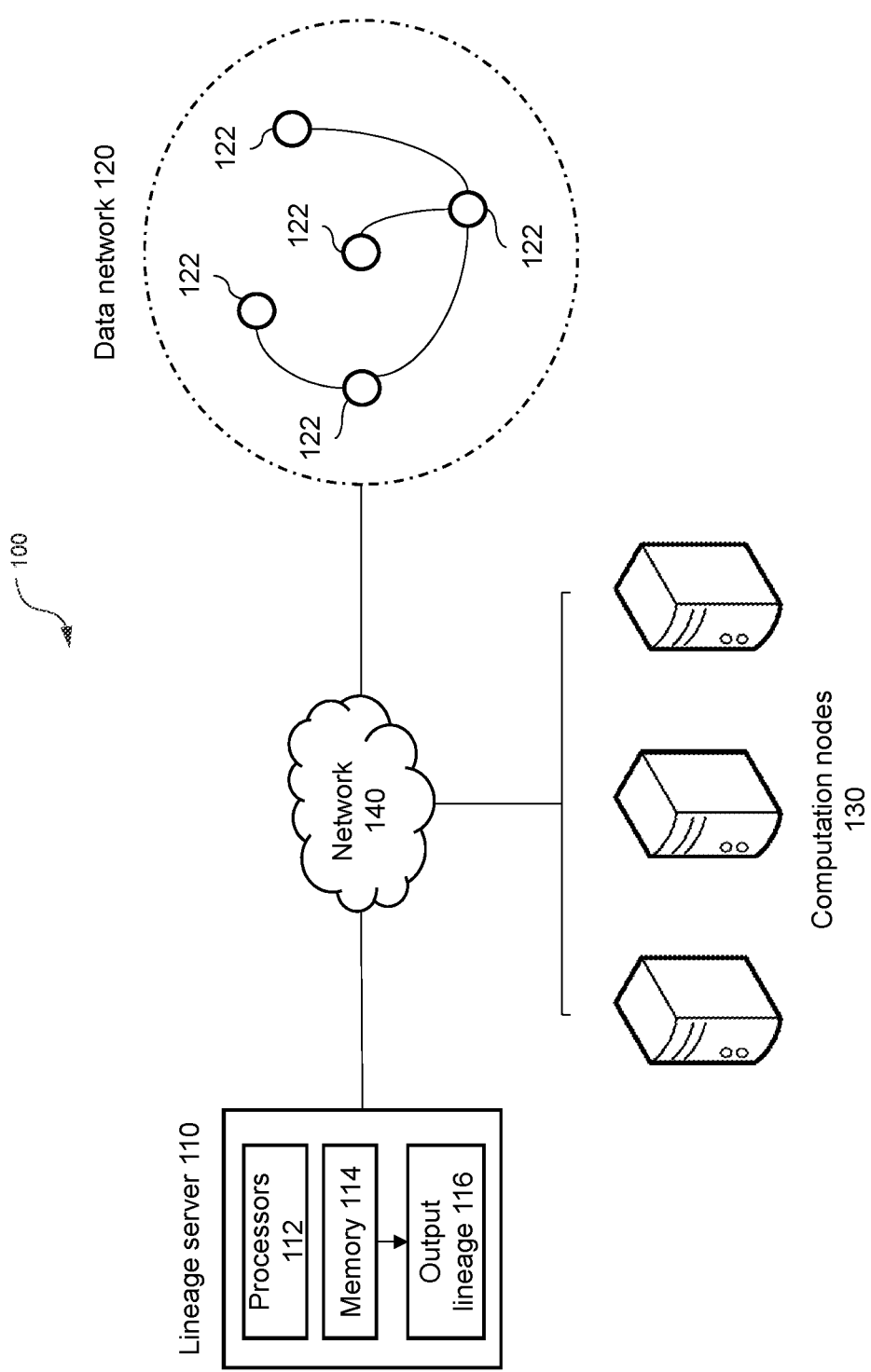
FIG. 1 illustrates an exemplary embodiment of a system for processing dataflow lineage information, according to the present disclosure.

FIG. 1 illustrates an exemplary embodiment of a system 100 for processing dataflow lineage information, according to certain embodiments of the present disclosure. System 100 includes a lineage server 110, a data network 120, multiple computation nodes 130, and a network 140. As illustrated the data network 120 includes multiple data storage nodes 122.

In general, system 100 aggregates control values (e.g., lineage control values 308, version control values 408) as data flows through the nodes of system 100, for example such as the data storage nodes 122 and computation nodes 130, and generates an output lineage 116 based on the control values. This process will be described below in greater detail with reference to FIGS. 2-10.

Lineage server 110 is a special purpose computer configured to process dataflow lineage information and generate output lineage 116, according to the embodiments of the present disclosure. Lineage server 110 comprises one or more processors 112 and a memory 114 that implement the algorithm discussed herein. Specifically, the lineage server 110 is configured to aggregate the lineage control values 308 as data flows through the data storage nodes 122. The lineage server 110 is further configured to aggregate the version control values 408 as data flows through the computation nodes 130. Based on the lineage control values 308 and the version control values 408 that are aggregated along a dataflow path, the lineage server 110 generates an output lineage 116 that is specifically constructed to represent a data life cycle that includes the data's origin and where it moves over time. The output lineage 116 is configured to describe what happens to data as it goes through diverse processes and can help with efforts to analyze how information is used and to track key bits of information that serve a particular purpose. The generation of the lineage control values 308, version control values 408, and the output lineage 116 will be discussed below in greater detail with reference to FIGS. 6-9.

Figure 2:
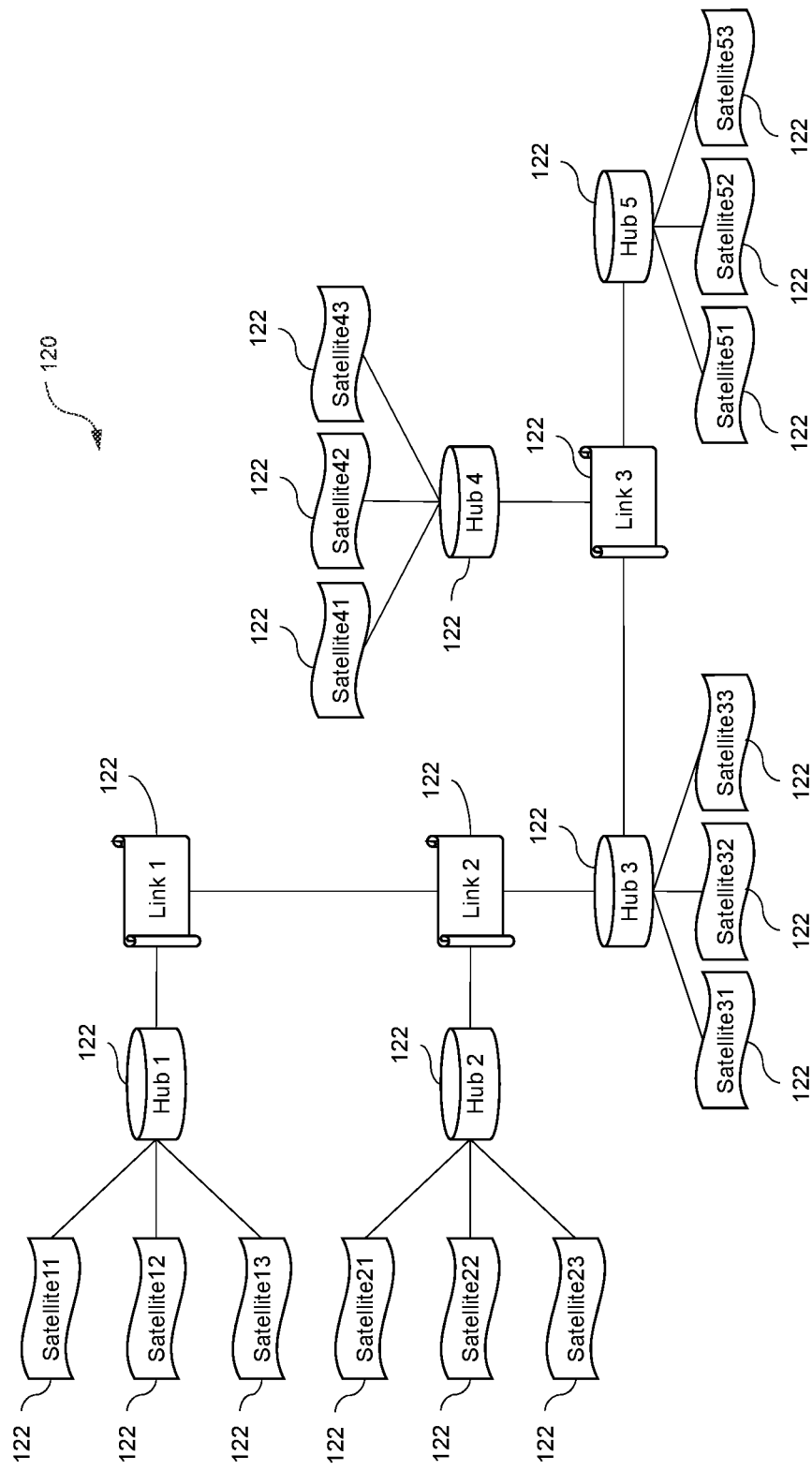
FIG. 2 illustrates an exemplary embodiment of a data network, according to the present disclosure.

Data network 120 is a network that is specifically configured with a number of data storage nodes 122. FIG. 2 illustrates an exemplary embodiment of a data network 120, according to some embodiments of the present disclosure. In some embodiments, the data network 120 includes a number of data storage nodes 122 that are arranged in a tree-like structure, and circular references in the branching architecture are not allowed.

In one embodiment, the data storage nodes 122 in the data network 120 are organized in a hierarchy with three types: link nodes 122, hub nodes 122, and satellite nodes 122. Each hub node 122 holds normalized tables of similar content. The hub nodes 122 are configured to organize data via primary keys which connect different satellite tables 300 that hold specific data. Satellite nodes 122 are configured to store tables 300 that contain all the specific data related to the keys in hub nodes 300. Single satellite node 122 holds data of a single data type, while many satellite nodes 122 contain different data types that can connect to a primary key in a hub node 122 to achieve the effect of aggregation of various data types. Link nodes 122 are nodes that connect different hub nodes 122. Link nodes 122 are special versions of hub nodes 122 that contain relationships among various hub nodes 122. Referring to FIG. 2, the satellite nodes 122 "satellite11," "satellite21," and "satellite31" are connected to the hub node 122 "hub 1," which is further connected to the link node 122 "link 1." The link node 122 "link 1" is further connected to the link node 122 "link 2," which is further connected to the hub nodes 122 "hub 2" and "hub 3."

As mentioned above, the data storage nodes 122, for example such as the link nodes 122, hub nodes 122, and satellite nodes 122, are configured to store node tables 300 that hold specific data. FIG. 3 illustrates an exemplary embodiment of a node table 300, according to some embodiments of the present disclosure. Node table 300 is configured with multiple node entries 310, where each node entry 310 corresponds to a data storage node 122. In some embodiments, each data storage node 122 is configured to store a node table 300 that is replicated and stored in each of the data storage nodes 122. As illustrated in FIG. 3, the node table 300 includes multiple entries node 310a-c, and each of the node entries 310a-c is configured to include a node ID 302, a node value 304, a timestamp 306, and a lineage control value 308. The node ID 302 is an identifier that identifies a corresponding data storage node 122. The node value 304 is a data value corresponding to an input data as the input data flows through a corresponding data storage node 122. The timestamp 306 indicates a time when a change occurs to the node value 304. The lineage control value 308 is generally an encoded string of the location of every value (e.g., node IDs 302, node values 304, timestamps 306) in every node table 300 in the data storage nodes 122. In one embodiment, the lineage control value 308 is generated as a hash value associated with the node ID 302, the node value 304, and the timestamp 306. In alternative embodiments, the lineage control value 308 is generated as a hash value associated with the node ID 302 and the node value 304. In some embodiments, the lineage control value 308 is a checksum value. As the data flows through one data storage node 122 to another, the lineage control values 308 associated with the data storage nodes 122 are summed to carry the path that the data passes through. The generation of the lineage control value 308 is discussed below in greater detail with reference to FIG. 6.

Figure 6:
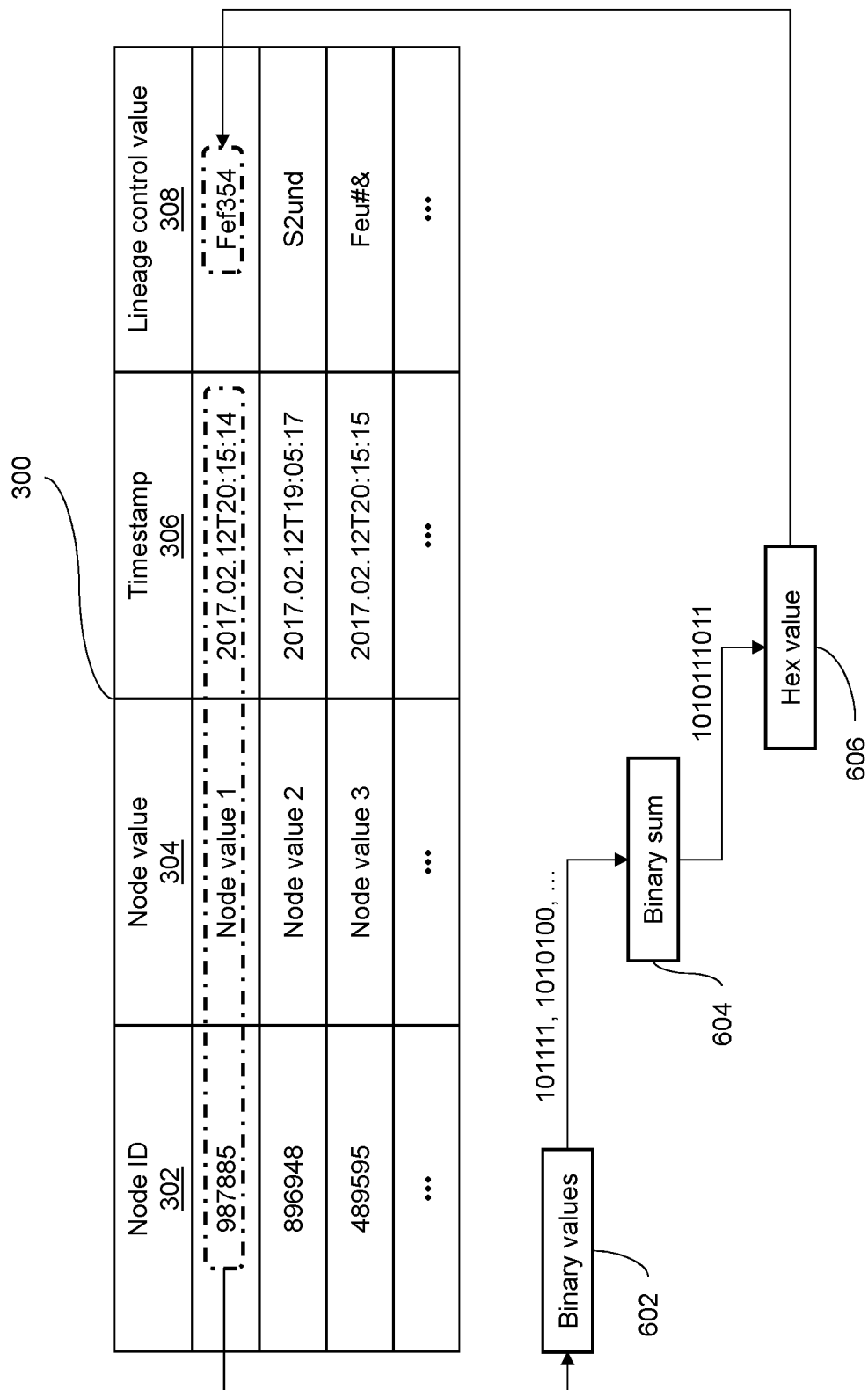
FIG. 6 illustrates an exemplary embodiment of generating lineage control values, according to the present disclosure.

FIG. 6 illustrates an exemplary embodiment of generating lineage control values 308, according to some embodiments of the present disclosure. A lineage control value 308 includes checksum control for the systematic population of all values (e.g., node IDs 302, node values 304, timestamps 306) in all node tables 300 across the architecture. Checksum assures that all values are fed into the database from the original sources or calculated by the approved calculation algorithms without meddling in the process that conducts the population. The algorithm of generating a lineage control value 308 starts by transforming the values in a node entry 310, for example such as the node ID 302, the node value 303, and/timestamp 306 into binary values 602. The binary values 602 for each node entry 310 are then summed to obtain the binary sum 604. The binary sum 604 is then transformed to a hexadecimal representation to obtain the encoded string for the lineage control value 308 in each node entry 310.

Figure 7:
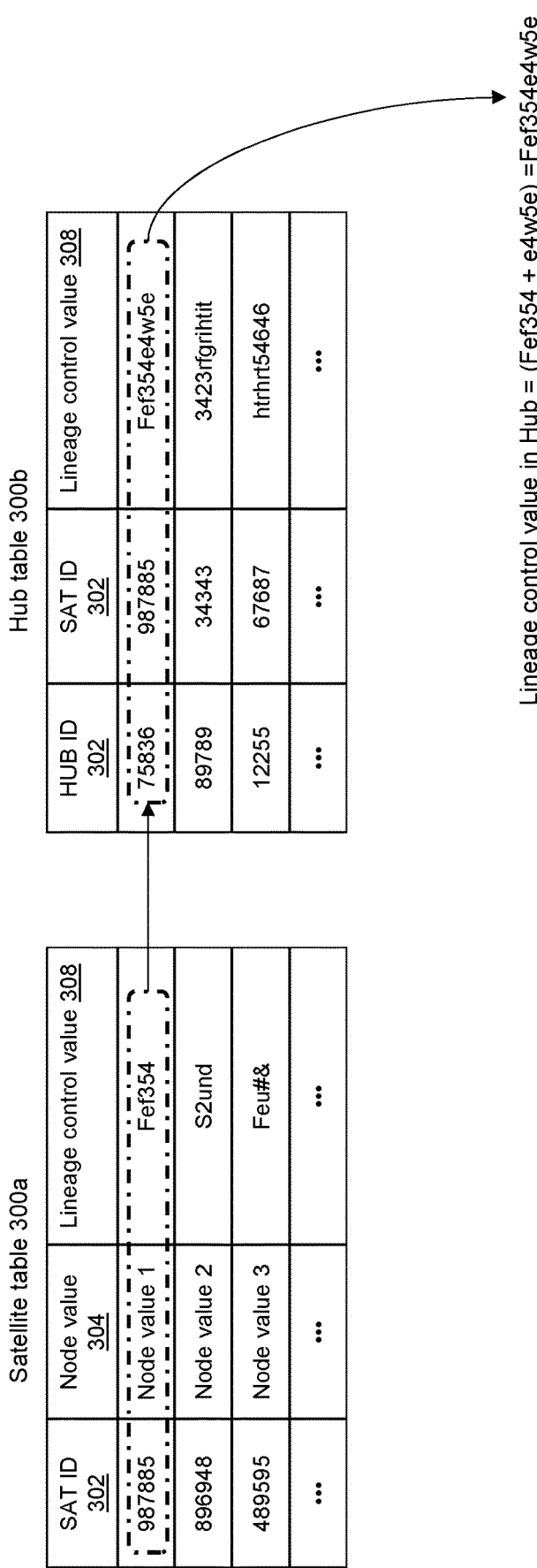
FIG. 7 illustrates an exemplary embodiment of generating lineage control values, according to the present disclosure.

Note that although the node table 300 is illustrated in FIGS. 3 and 6 as including node entries 310 configured with node IDs 302, node values 304, timestamps 306, and lineage control values 308, it is for illustrative purpose only. The node entries 310 of a node table 300 may have any suitable number of values that may be the same or different from each other. For example, the node entries 310 of a hub table 300 may have different numbers of values from the node entries 310 of a satellite node 122. Furthermore, in some embodiments, the node entries 310 of a hub table 300 may include lineage control values 308 that are determined based on the lineage control values 308 in the node tables 300 of associated satellite nodes 122. FIG. 7 illustrates an exemplary embodiment of generating lineage control values 308 for a hub node 122. In FIG. 7, the hub table 300b is stored in a hub node 122 that is connected to a satellite node 122 that stores the satellite table 300a. Since the satellite node 122 connects to the hub node 122, every row in the hub table 300b include a lineage control value 308 that is not only a derivation of an original lineage control value 308 corresponding to a hub node 122, but also the lineage control value 308 of the underlying satellite nodes 122. For example, in the figure, the node value 304 "node value 1" in the satellite table 300a is associated with a lineage control value 308 of a string "Fef354." When data flows via the hub node 122 that stores the node table 300b, it aggregates the original lineage control value 308 (e.g., "e4w5e") in the hub table 300b that corresponds to the hub node 122 and the lineage control value 308 (e.g., "Fef354") of the satellite node 122, thus having a resultant lineage control value 308 of "Fe354e4w5e."

Figure 5:
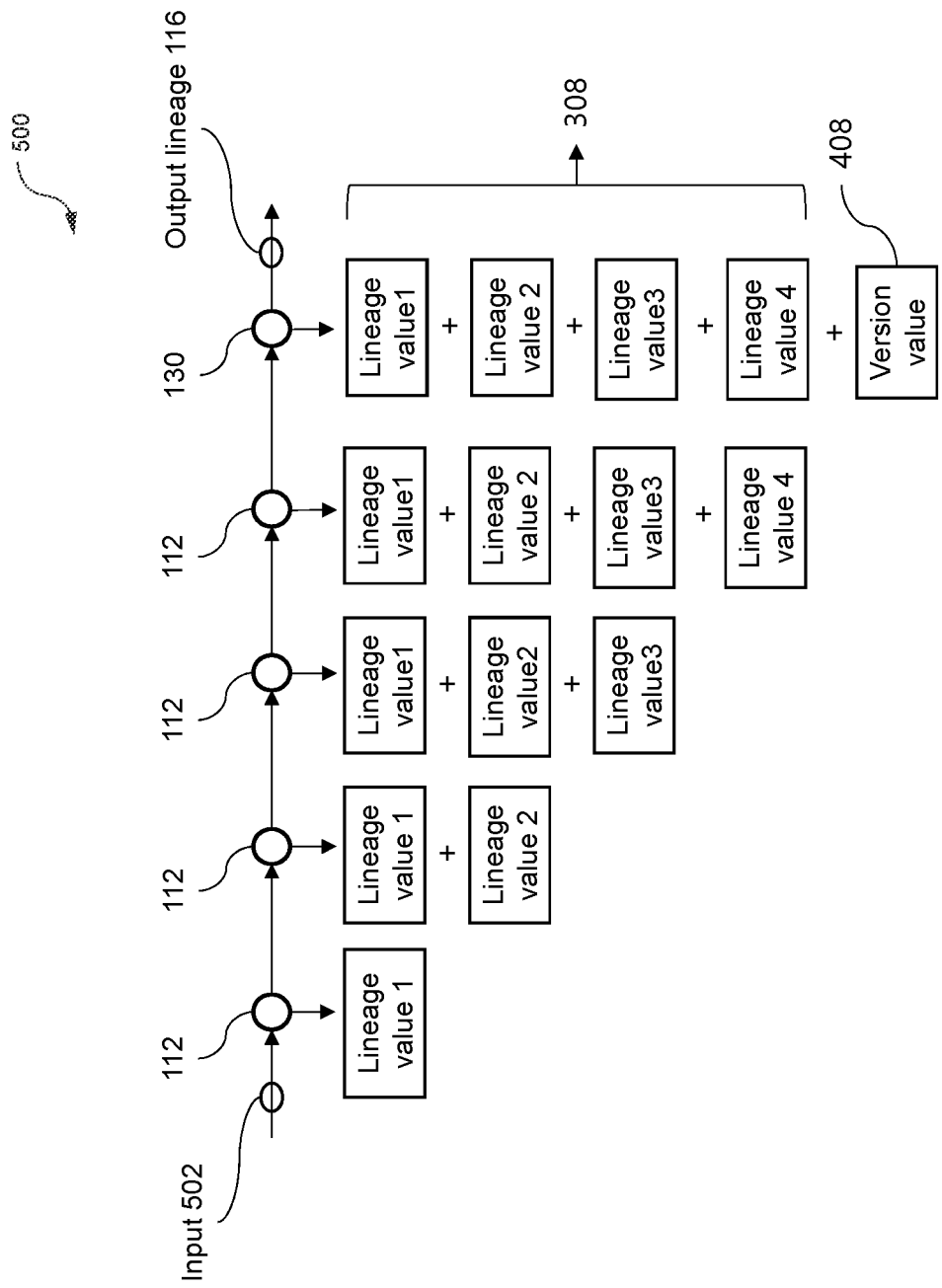
FIG. 5 illustrates an exemplary embodiment of aggregating lineage information for a dataflow path, according to the present disclosure.

Referring back to FIG. 1, the computation nodes 130 of system 100 are special purpose computers that are configured to perform data transformations on data that flows through the computation nodes 130. Each of the computation nodes 130 is configured to store a version control table 400. Referring to FIG. 4, a version control table 400 is configured with multiple version control entries 410, wherein each version control entry 410 corresponds to a version of a computation algorithm performed by the computation node 130. For example, in the figure, the version control table 400 is configured as including version control entries 410a-c and each of the version control entries 410a-c includes a computation name 402 identifying a computation algorithm performed by the computation node 130, a version value 404 identifying a particular version of the computation algorithm, a timestamp 406 indicating a time of change of the version, and a version control value 408. The version control value 408 is generally an encoded string of the location of every value (e.g., computation names 402, version values 404, timestamps 406) in every version control table 400 in the computation nodes 130. In one embodiment, the version control value 408 is generated as a hash value associated with the computation names 402, version values 404, and timestamps 406. In alternative embodiments, the version control value 408 is generated as including a hash value associated with the computation names 402 and version values 404. In some embodiments, the version control value 408 is a checksum value. Because the version control value 408 in a version control table 400 includes information related to a version of a computation algorithm, the version control value 408 is a version control stamp of the computation algorithm that performs a specific calculation in the computation node 130. As data flows through multiple data storage nodes 122, the lineage control values 308 associated with the data storage nodes 122 are summed to carry the path that the data passes through. And as the data reaches a computation node 130, the summed lineage control values 308 is appended to the version control value 408 of the computation node 130. FIG. 5 illustrates an exemplary embodiment of aggregating lineage information including lineage control values 308 and version control values 408 for a dataflow path 500.

Referring to FIG. 5, a data flow path 500 includes multiple data storage nodes 122 and one or more computation nodes 130. For example, the dataflow path 500 includes data storage nodes 122a-d and computation node 130a. The aim of the lineage aggregation is to trace the result obtained by series of calculations, to its original inputs and the algorithm that created the result. As the input data element 502 flows through the network, for example such as the dataflow path 500, to reach the computation algorithm of the computation node 130a, it pools all computation algorithms along the way within the architecture to aggregate the lineage control values 308 of the data storage nodes 122a-d and the version control value 408 of the computation node 130 and generates an output lineage 116 as a sum of the lineage control values 308 and the version control value 408.

Figure 8:
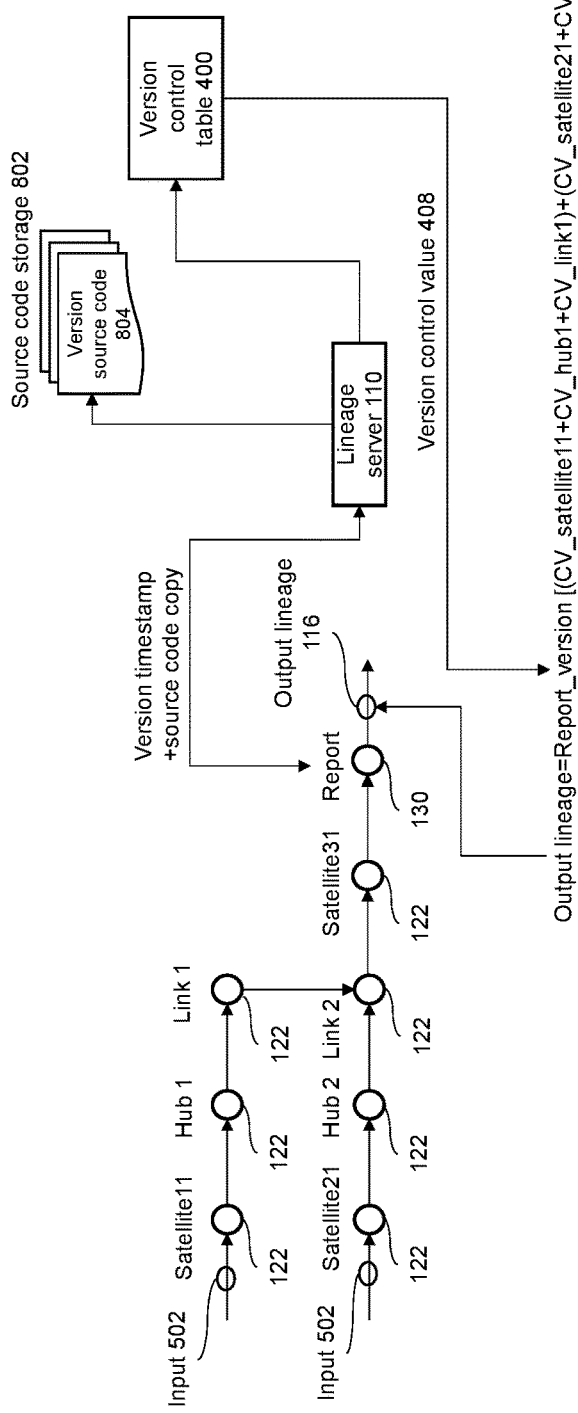
FIG. 8 illustrates an exemplary embodiment of aggregating version control values, according to the present disclosure.

In some embodiments, when the lineage server 110 aggregates the version control values 408 of the computation nodes 130, it further stores the source code 804 for each computation algorithm and tracks the changes to it over time. FIG. 8 illustrates an exemplary embodiment of a version control of the computation algorithm. Referring to FIG. 8, input data elements 502 flows through the data storage nodes 122 to the "report" algorithm of the computation node 130. The lineage server 110 makes periodic downloads of the algorithm from the source code storage 802 and stores the source code 804 or application in its internal database (e.g., memory 114). If the newly downloaded source code 804 with a new version value 404 is different from the previous, the newly downloaded source code 804 with the new version value 404 will be saved and given a timestamp 406 as well as a version control value 408. As the input data elements 502 come to the computation algorithm of the computation node 130, all the lineage control values 308 of the data storage nodes 122 the input data elements 502 passes through will be aggregated, and the version control value 408 of the computation algorithm will be appended as shown in FIG. 8. Thus, the system 100 can observe the time/version change of all the algorithms in the system 100.

Referring back to FIG. 1, network 140 includes any suitable networks operable to support communication between components of system 100. Network 140 may include any type of wired or wireless communication channel capable of coupling together computing nodes. Network 140 may include any interconnecting system capable of transmitting audio, video, electrical signals, optical signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 140 may be configured to support any communication protocols as would be appreciated by one of ordinary skill in the art upon viewing this disclosure.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

Figure 9:
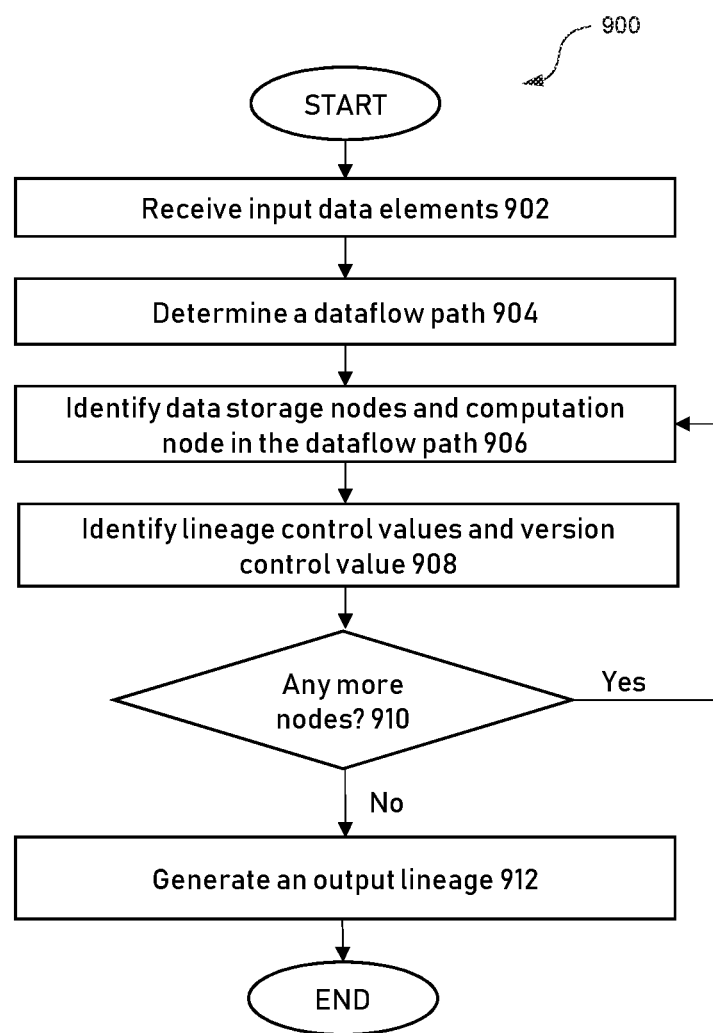
FIG. 9 illustrates a flow chart presenting an exemplary embodiment of a method of processing dataflow lineage information, according to the present disclosure.

FIG. 9 illustrates a flow chart presenting an exemplary embodiment of a method 900 of processing dataflow lineage information, according to some embodiments of the present disclosure. The following is a non-limiting example that illustrates how system 100 implements method 900.

Upon starting the process, system 100 receives one or more input data elements 502 (step 902). For example, one or more data storage nodes 122 may receive one or more input data elements 502.

At step 904, system 100 determines a dataflow path 500 for the one or more input data elements 502. The data flow path 500 may include multiple data storage nodes 122 and one or more computation nodes 130. Each of the data storage nodes 122 is associated with a lineage control value 308 and each of the computation nodes 130 is associated with a version control value 408. As the input data elements 502 passes along the dataflow path 500 through the data storage nodes 122 and the computation nodes 130, the lineage server 120 aggregates the lineage control values 308 associated with the data storage nodes 122 and the version control values 408 associated with the computation nodes 130.

At step 906, the system 100 identifies the data storage nodes 122 and the computation nodes 130 in the dataflow path 500. The system 100 may further identify the node tables 300 that are stored in the data storage nodes 122 and the version control tables 400 that are stored in the computation nodes 130.

At step 908, the system 100 identifies the lineage control values 308 associated with the data storage nodes 122 and the version control values 408 associated with the computation nodes 130 as determined at step 906. For example, the lineage server 110 may identify a node table 300 that is stored in a data storage node 122 in the dataflow path 500. Next, the lineage server 110 identifies a node entry 310 in the node table 300 that corresponds to the data storage node 122. The lineage server 110 then identifies the lineage control value 308 in the identified node entry 310. The lineage server 110 may further associate the identified lineage control value 308 to the input data elements 502. For example, the lineage server 110 may accumulates the lineage control values 308 of the data storage nodes 122 along the dataflow path 500 for the input data elements 502.

Similarly, the lineage server 110 may identify a version control table 400 that is stored in a computation node 130 in the dataflow path 500. The lineage server 110 then identifies a version control entry 310 in the version control table 400 that is associated with a most recent (e.g., latest) timestamp 406. Next, the lineage server 110 identifies the version control value 408 in the identified version control entry 310 with the most recent timestamp 406. The lineage server 110 may further associate the identified version control value 408 to the input data elements 502. For example, the lineage server 110 may accumulates the version control values 408 of the computation nodes 130 along the dataflow path 500 for the input data elements 502.

At step 910, the system 100 determines whether the lineage information (e.g., lineage control values 308 and version control values 408) of all the data storage nodes 122 and the computation nodes 130 has been aggregated. If the system 100 determines that the lineage information of all the data storage nodes 122 and the computation nodes 130 has been aggregated, the process 900 proceeds to step 912. If the system 100 determines that the lineage information of one or more of the data storage nodes 122 and/or the computation nodes 130 still need to be aggregated, the process 900 proceeds back to step 906.

At step 912, the system 100 generates an output lineage 116 based on the lineage control values 308 and the version control values 408 that are collected when the input data elements 502 passes through the data storage nodes 122 and the computation nodes 130 along the dataflow path 500. For example, the output lineage 116 may be generated as a sum of the lineage control values 308 and the version control values 408.

Figure 10:
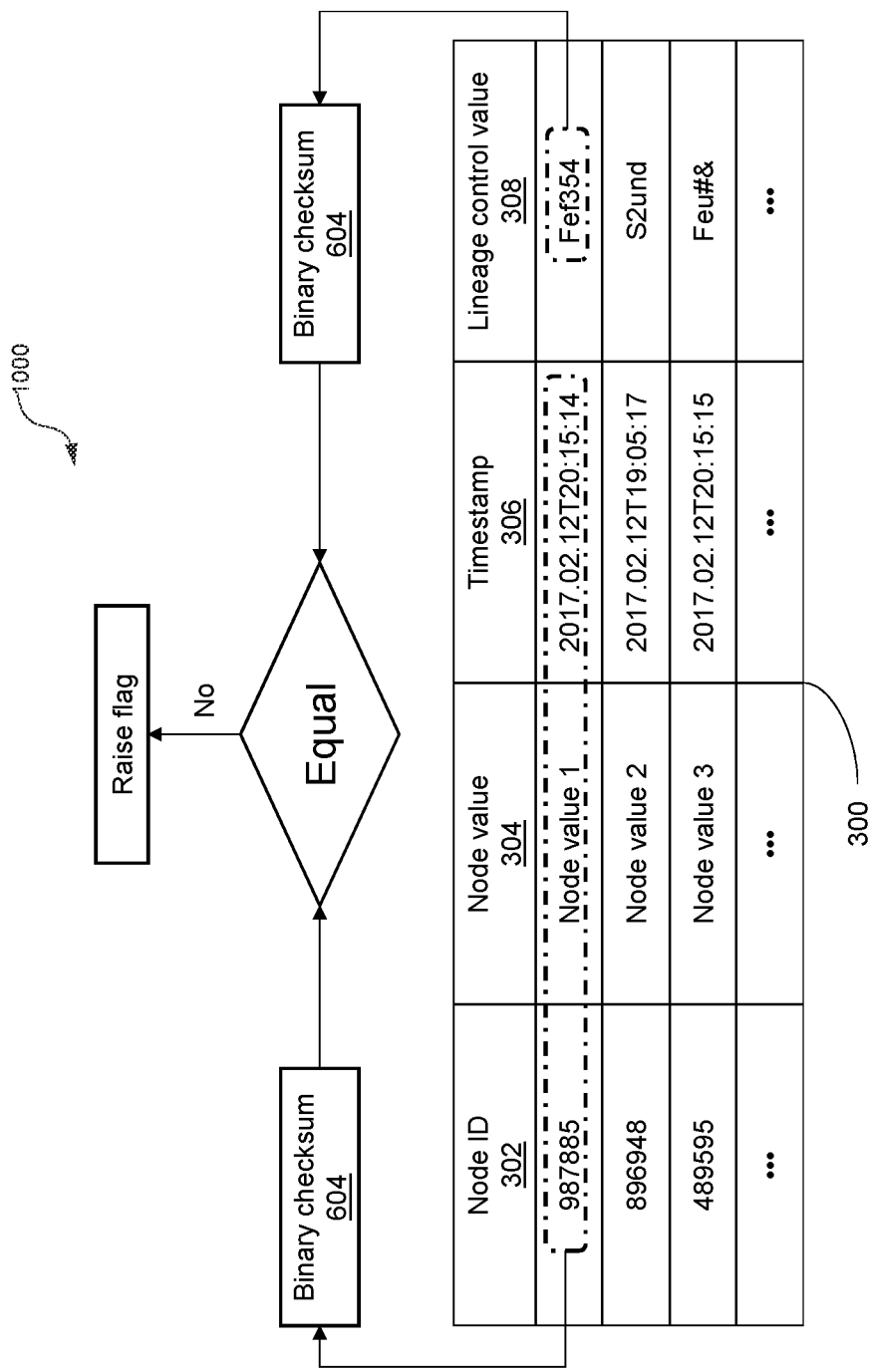
FIG. 10 illustrates an exemplary embodiment of checking data integrity, according to the present disclosure.

FIG. 10 illustrates an exemplary embodiment of checking data integrity for the lineage information in a node table 300 and/or a version control table 400, according to some embodiments of the present disclosure. The data values stored in a node table 300 and/or a version control table 400 may change due to various types of data disturbances in the system 100. Checking the data integrity for the lineage information (e.g., the lineage control values 308 and the version control values 408) helps determine whether there is potentially a data corruption in the system 100 that are caused by the data disturbances. As illustrated in the figure, the data integrity check may be performed by computing a checksum value of the values (e.g., node ID 302, node value 304, and/or timestamp 306) in the node table 300 and comparing it to the checksum value of the lineage control value 308 in the node table 300. If the two checksum values match, the data integrity check passes. If the two checksum values do not match, the data integrity check fails and a flag of potentially a data corruption will be raised.

As such, as data flows through the nodes of systems 100, the lineage information (e.g., lineage control values 308 and version control values 408) of all the data storage nodes 122 and the computation nodes 130 that the data flows through are aggregated. The lineage server 110 scans all the control values of all elements in the dataflow path 500 that the data flows along and generates an output lineage 116. Th lineage server 110 may further infers a dataflow graph from the control values. For example, the system 100 may generate a dataflow graph 1102 based on the output lineage 116. In some embodiments, the system 100 may generate a dataflow graph 1102 by parsing the output lineage 116 to extract the values stored in the lineage information. For example, the lineage server 110 may parse the checksum value of the lineage control values 308 and the version control values 408 in the output lineage 116 and extract the node IDs 302, node values 304, computation names 402, version values 404, and timestamps 306 and 406, etc. The lineage server 110 may build the dataflow graphs 1102 such that the graphs 1102 represent data dependencies between difference nodes/algorithms in the dataflow paths 500. In some embodiments, the dataflow graph 1102 is a directed acyclic graph (DAG).

When the lineage server 110 completes the discovery of the dataflow by aggregating the control values, the real time daily dataflow graph 1102 can be used for performing a lineage control. For example, the system 110 may store a historical record of the daily dataflow graphs 1102 and use the historical record to validate a newly generated input dataflow graph 1104. The validation of the input dataflow graph 1104 is discussed below with reference to FIGS. 11 and 12.

Figure 11:
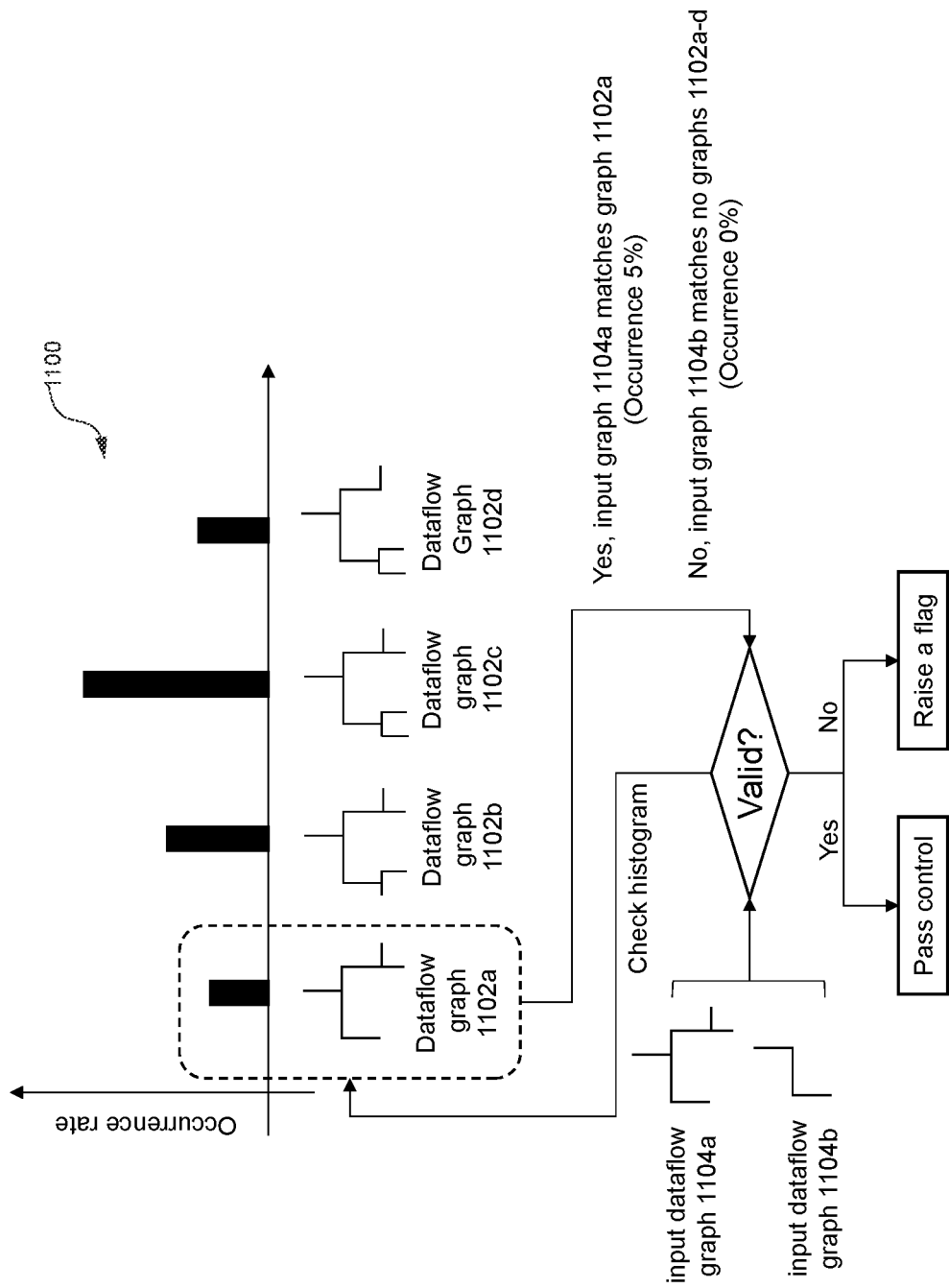
FIG. 11 illustrates an exemplary embodiment of performing a lineage control, according to the present disclosure.

FIG. 11 illustrates an exemplary embodiment of validating input dataflow graphs 1104. In general, the lineage server 110 may use machine learning algorithms to collect various dataflows and build histograms 1101 of all possible dataflow graphs 1102. For example, in the figure, the histogram 1101 generated by the lineage server 110 includes dataflow graphs 1102a-d and the occurrence rates associated with each of the dataflow graphs 1102a-d. The controlling mechanism of whether a dataflow is valid is to reference a newly arrived input dataflow graph 1104 with the histogram 1101 of graphs stored in the lineage server 110. If the input dataflow graph 1104 resembles one of the dataflow graphs 1102 and the occurrence rate associated with it is high, then the input dataflow graph 1104 is determined to be valid. If the occurrence rate is rare the lineage server 110 will flag the input dataflow graph 1104 as a potential technical challenge. And if the input dataflow graph 1104 is not in the histogram 1101 the lineage server 110 will raise a flag for technical escalation.

Figure 12:
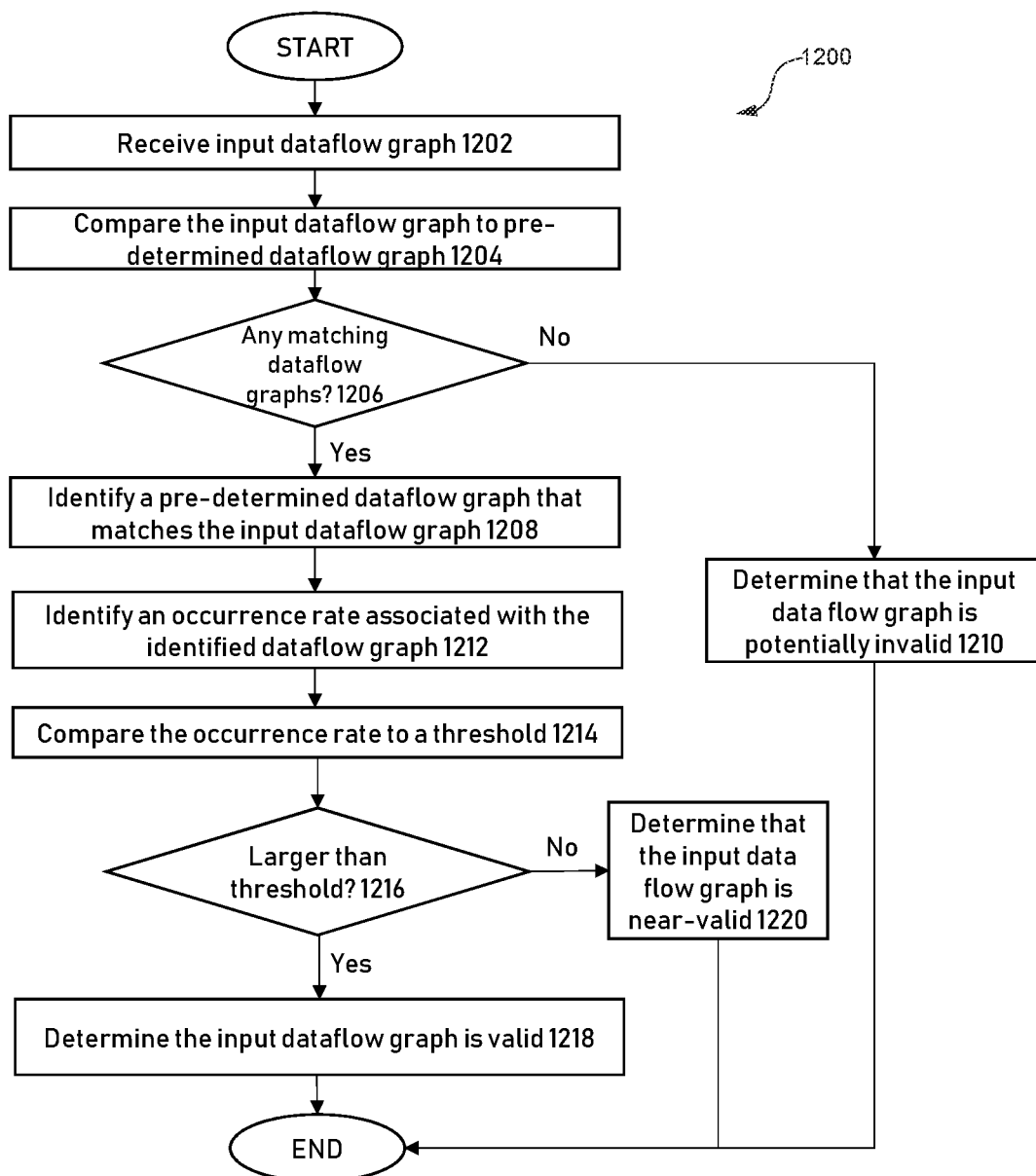
FIG. 12 illustrates an exemplary embodiment of a method of performing a lineage control, according to the present disclosure.

FIG. 12 illustrates an exemplary embodiment of a method 1200 of performing a lineage control by validating input dataflow graphs 1104. The following is a non-limiting example that illustrates how system 100 implements method 1200.

Before starting the process, system 100 may store a number of dataflow graphs 1102 and generate a histogram 1101 for the dataflow graphs 1102. Each of the dataflow graphs 1102 in the histogram 1101 is associated with an occurrence rate indicating a frequency of occurrence within a predetermined time period.

Upon starting the process, the system 100 receives an input dataflow graph 1104 (step 1202). For example, the system 100 may receive the input dataflow graph 1104 that was previously generated by the lineage server 110 based on an output lineage 116. The system 100 may determine whether the input dataflow graph 1104 matches a pattern that was previously observed.

At step 1204, system 100 compares the input dataflow graph 1104 to the dataflow graphs 1102 that are pre-stored in the lineage server 110. For example, system 100 may compare the pattern of the input dataflow graph 1104 with the patterns of each of the pre-stored dataflow graphs 1102.

At step 1206, system 100 determines whether the input dataflow graph 1104 matches any of the pre-stored dataflow graphs 1102. System 100 may compare the pattern of the input dataflow graph 1104 with the patterns of each of the pre-stored dataflow graphs 1102 to see if any of the pre-stored dataflow graphs 1102 has a pattern that matches the pattern of the input dataflow graph 1104. If the system 100 determines that the input dataflow graph 1104 matches one of the pre-stored dataflow graphs 1102, the process 1200 proceeds to step 1208. If the system 100 determines that the input dataflow graph 1104 does not match any one of the pre-stored dataflow graphs 1102, the process 1200 proceeds to step 1210.

At step 1208, system 100 identifies a pre-stored dataflow graph 1102 that matches the input dataflow graph 1104 if the system 100 determines that the input dataflow graph 1104 matches one of the pre-stored dataflow graphs 1102. The matching dataflow graph 1102 may have a pattern that matches the pattern of the input dataflow graph 1104.

At step 1210, system 100 determines that the input dataflow graph 1104 is potentially invalid if the system 100 determines that the input dataflow graph 1104 does not match any one of the pre-stored dataflow graphs 1102. The system 100 may further store the input dataflow graph 1104 in the lineage server 110 and flag the input dataflow graph 1104 as potentially an invalid dataflow graph 1102. Note that if the system 100 receives another input dataflow graph 1104 that matches the first input dataflow graph 1104, the system 100 may stop flagging the first input dataflow graph 1104 as potentially invalid.

At step 1212, system 100 identifies an occurrence rate associated with the matching dataflow graph 1102 that was previously determined at step 1208. The occurrence rate associated with the dataflow graph 1102 indicates a frequency of occurrence of the dataflow graph 1102 that has been observed. A high occurrence rate may indicate that the dataflow graph 1102 has been observed for many times, thus the system 100 may determine that the input dataflow graph 1104 that matches the pre-stored dataflow graph 1102 is potentially valid. A low occurrence rate may indicate that the dataflow graph 1102 has been observed for only a few times, thus the system 100 may determine that the input dataflow graph 1104 that matches the pre-stored dataflow graph 1102 is potentially near-valid.

At step 1214, system 100 compares the occurrence rate as determined at step 1212 to a pre-determined threshold. The pre-determined threshold will be used to determine whether an input dataflow graph 1104 is potentially valid or near-valid.

At step 1216, system 100 determines whether the occurrence rate as determined at step 1212 is larger than the pre-determined threshold. If the system 100 determines the occurrence rate is higher than the pre-determined threshold, the process 1200 proceeds to step 1218. If system 100 determines that the occurrence rate is equal to or lower than the pre-determined threshold, the process 1200 proceeds to step 1220.

At step 1218, system 100 determines that the input dataflow graph 1104 is potentially valid if system 100 determines that the occurrence rate is higher than the pre-determined threshold.

At step 1220, system 100 determines that the input dataflow graph 1104 is potentially near-valid if system 100 determines that the occurrence rate is equal to or lower than the pre-determined threshold.

Figure 13:
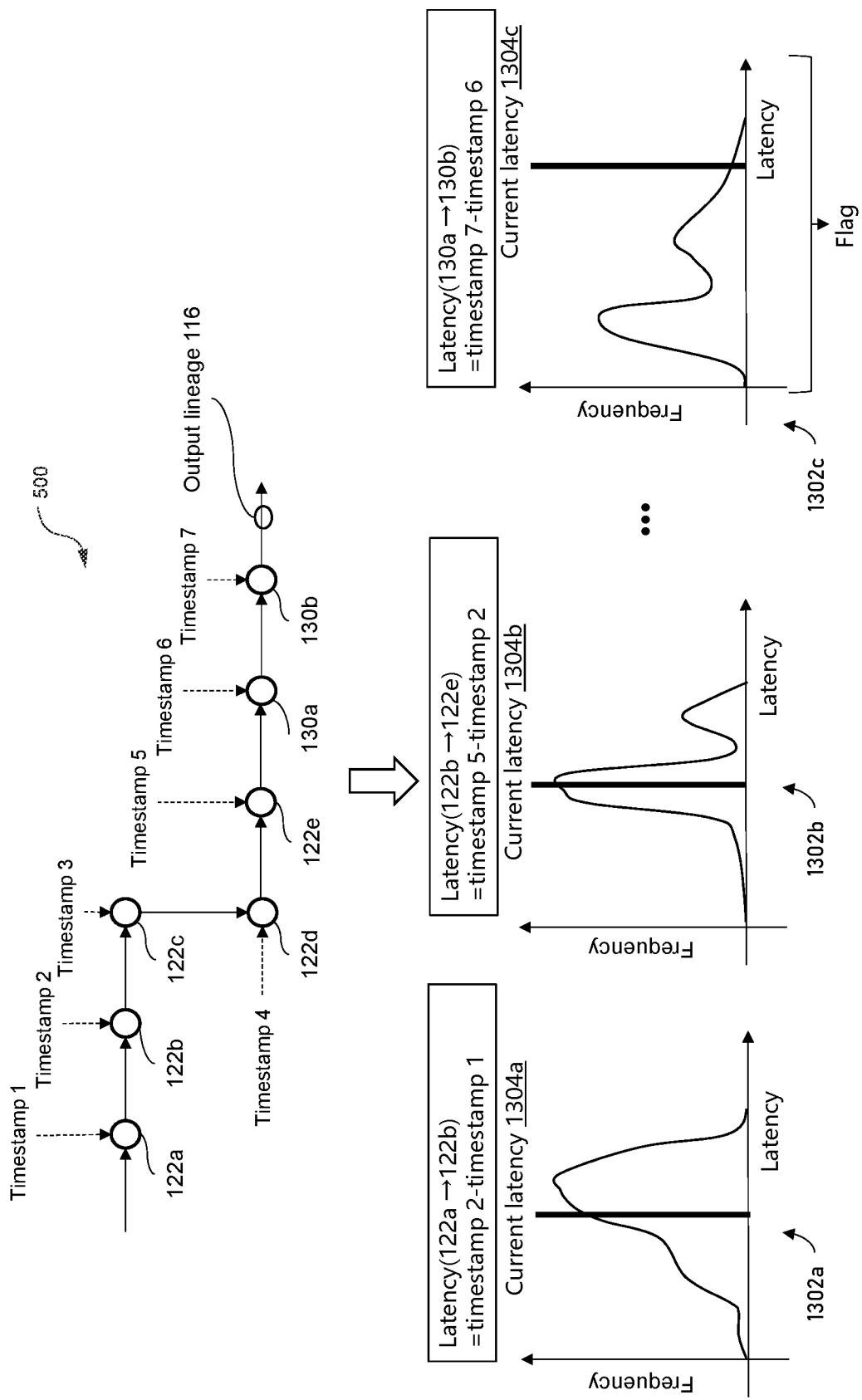
FIG. 13 illustrates an exemplary embodiment of performing a timeliness control, according to the present disclosure.

FIG. 13 illustrates an exemplary embodiment of performing a timeliness control. In general, the system 100 keeps a historical record of timestamps for all nodes of all dataflows for performing a timeliness control by determining latencies between network nodes. In many cases data can arrive at the storage location with the correct dataflow according to expectation by the lineage server, however there might be significant delay between data transformations that can disrupt the synchronization of the system. Dataflow timestamps contained in the control values may also indicate inputs that lack updates, which in effect causes stale inputs into the data transformation algorithms causing faulty outputs. The lineage server 110 therefore flags any abnormal latencies in the dataflow. For example, in FIG. 13, system 100 may determine an output lineage 116 for the dataflow path 500 that includes the data storage nodes 122a-e and the computation nodes 130a-b. The output lineage 116 may be a sum of the lineage information associated with the nodes of the dataflow path 500, for example such as the lineage control values 308 and the version control values 408. Note that as mentioned before, each of the lineage control values 308 and/or version control values 408 is a hash value (e.g., checksum value) associated with a timestamp and other values. System 100 may extract the timestamps from the hash values by decoding/decrypting the hash values. By extracting the timestamps from the lineage information for each of the nodes, system 100 can determine a latency 1304 between any two of the nodes.

Furthermore, system 100 can also track the latency 1304 between any two of the nodes over time. For example, system 100 may determine an occurrence rates for each of the latencies 1304 that are determined for two nodes within a pre-determined time period. As illustrated in FIG. 13, system 100 generates multiple latency distribution graphs 1302a-c for any two of the nodes along a dataflow path 500. Each of the latency distribution graphs 1302a-c represents a historical record of a relationship between occurrence rates (e.g., frequency) and latencies 1304 for a pair of the nodes in the dataflow path 500. The occurrence rate indicates a frequency of a latency 1304 that were observed within a pre-determined time period. When system 100 determines a new latency 1304 for a pair of nodes in the dataflow path 500, the system 100 identifies a latency distribution graph 1302 for the pair of nodes and identifies a latency 1304 in the latency distribution graph 1302 that matches the newly determined latency 1304. Then, system 100 may identify an occurrence rate in the latency distribution graph 1302 that corresponds to the matching latency 1304. After identifying the matching latency 1304, system 100 compares the occurrence rate of the matching latency 1304 to a pre-determined threshold. If the occurrence rate of the matching latency 1304 is below the pre-determined threshold, system 100 determines that the matching latency 1304 was rarely observed, thus may indicate a network anomaly occurring between the pair of nodes. For example, in FIG. 13, a latency 1304c is determined for the nodes 130a and 130b and is compared against the latency distribution graph 1302c. The determined latency 1304c is found at the tail of the latency distribution graph 1302c and the frequency corresponding to the latency 1304 is very low. The low frequency indicates that the latency 1304c has been observed only for a limited number of time, thus may indicate that there is potentially a network anomaly occurring between the node 130a and 130b.

Figure 14:
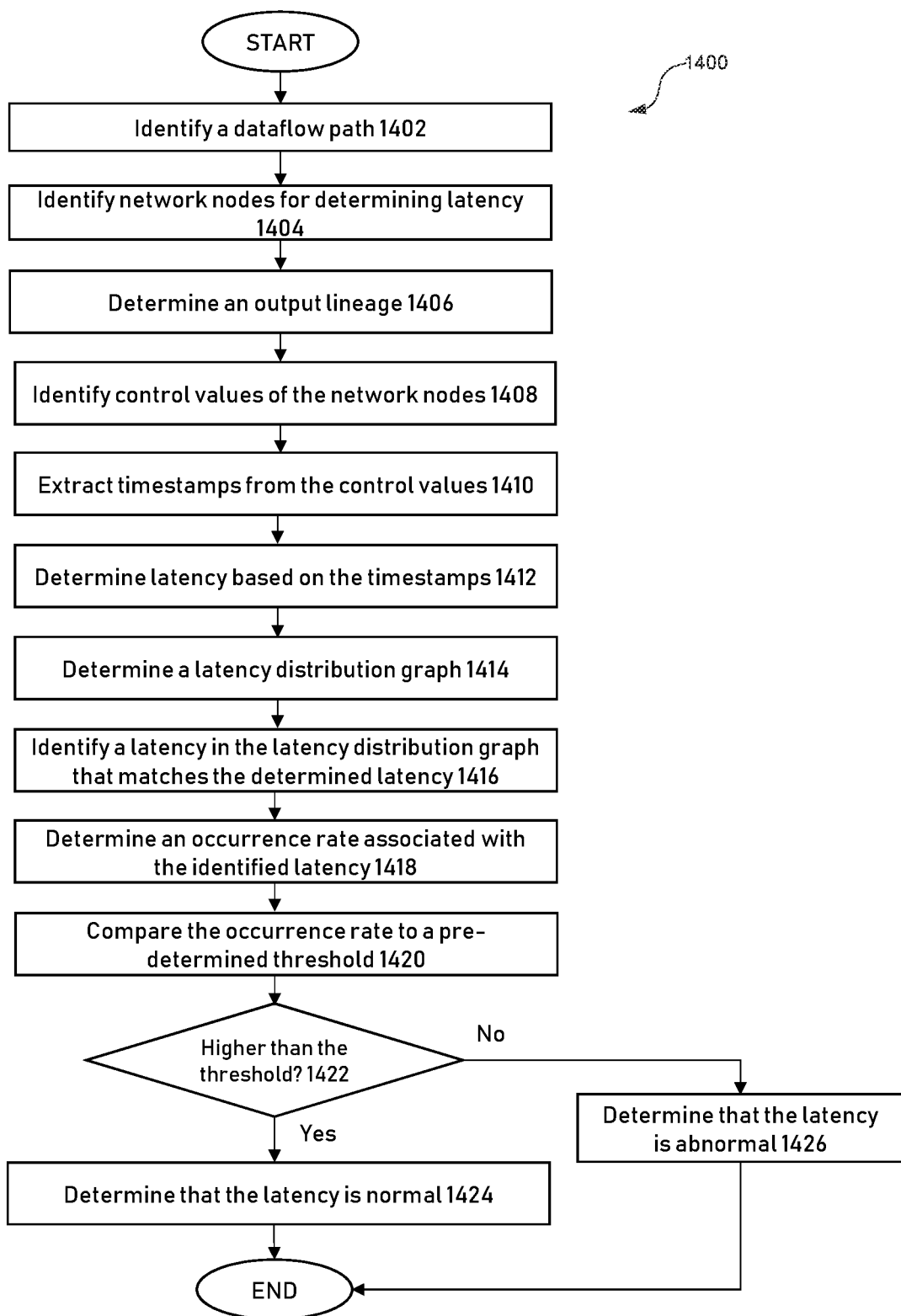
FIG. 14 illustrates an exemplary embodiment of a method of performing a lineage control, according to the present disclosure.

FIG. 14 illustrates an exemplary embodiment of a method 1400 of performing a timeliness control for network nodes. The following is a non-limiting example that illustrates how system 100 implements method 1400.

Upon starting the process, system 100 identifies a dataflow path 500 that includes multiple network nodes for determining latencies 1304 between the network nodes (step 1402). For example, system 100 may identify a dataflow path 500 including multiple data storage nodes 122 and one or more computation nodes 130. System 100 may determine the latency 1304 between each pair of the network nodes of the dataflow path 500.

At step 1404, system 100 identifies the network nodes in the dataflow path 500 for determining latencies 1304. System 100 may identify any pair of network nodes in the dataflow path 500 for determining the latency 1304. For example, system 100 may identify two data storage nodes 122 for determining a latency 1304 between the two data storage nodes 130. As another example, system 100 may identify a data storage node 122 and a computation node 130 for determining a latency 1304 between them.

At step 1406, system 100 determines an output lineage 116 for the dataflow path 500 as determined at step 1402. The output lineage 116 may be determined as including a sum of the lineage information associated with each of the network nodes in the dataflow path 500. For example, the output lineage 116 may include the lineage control values 308 associated with the data storage nodes 122 and the version control values 408 associated with the computation nodes 130 in the dataflow path 500.

At step 1408, system 100 identifies the control values from the output lineage 116 as determined at step 1406 for the network nodes as identified at step 1404. For example, system 100 may identify the lineage control values 308 associated with two data storage nodes 122 from the output lineage 116. As another example, system 100 may identify the lineage control value 308 associated with a data storage node 122 and the version control value 408 associated with a computation node from the output lineage 116.

At step 1410, system 100 extracts timestamps form the control values (e.g., lineage control values 308 and/or version control values 408) as determined at step 1408. Because each of the lineage control values 308 and/or version control values 408 is a hash value (e.g., checksum value) associated with a timestamp and other values, system 100 may extract the timestamps from the hash values by decoding/decrypting the hash values. For example, system 100 may extract a timestamp 306 from a lineage control value 308 associated with a data storage node 122, and another timestamp 406 from a version control value 408 associated with a computation node 130.

At step 1412, system 100 determines a latency 1304 for two network nodes based on the timestamps as determined at step 1410. For example, system 100 may determine a first timestamp 306 for a first data storage node 122 and a second timestamp 306 for a second data storage node 122. System 100 may subtract the second timestamp 306 from the first timestamp 306 to determine the latency 1304 between the first and the second data storage nodes 122.

At step 1414, system 100 determines a latency distribution graph 1302 for the network nodes as determined at step 1404. A latency distribution graph 1302 represents a historical record of a relationship between occurrence rates (e.g., frequency) and latencies 1304 for a pair of the nodes in the dataflow path 500. The occurrence rate indicates a frequency of a latency 1304 that were observed within a pre-determined time period. Each pair of the network nodes in the dataflow path 500 is associated with a latency distribution graph 1302. System 100 may identify a latency distribution graph 1302 that was previously generated based on historical data and that corresponds to the network nodes as determined at step 1404.

At step 1416, system 100 identifies a latency 1304 in the latency distribution graph 1302 as determined at step 1414 that matches the latency 1304 as determined at step 1412.

At step 1418, system 100 identifies an occurrence rate in the latency distribution graph 1302 that corresponds to the matching latency 1304 as determined at step 1416.

At step 1420, system 100 compares the occurrence rate as determined at step 1418 to a pre-determined threshold.

At step 1422, system 100 determines whether the occurrence rate as determined at step 1418 exceeds the pre-determined threshold. If system 100 determines that the occurrence rate as determined at step 1418 exceeds the pre-determined threshold, the process 1400 proceeds to step 1424. If system 100 determines that the occurrence rate as determined at step 1418 does not exceed the pre-determined threshold, the process 1400 proceeds to step 1426.

At step 1424, system 100 determines that the latency 1304 as determined at step 1412 is normal if system 100 determines that occurrence rate as determined at step 1418 exceeds the pre-determined threshold.

At step 1426, system 100 determines that the latency 1304 as determined at step 1412 is abnormal if system 100 determines that occurrence rate as determined at step 1418 does not exceed the pre-determined threshold.

In alternative embodiments, system 100 may compare the latency 1304 as determined at step 1412 to a second pre-determined threshold. If the latency 1304 exceeds the second pre-determined threshold, system 100 determines that the latency 1304 as determined at step 1412 is abnormal. If the latency 1304 does not exceed the second pre-determined threshold, system 100 determines that the latency 1304 as determined at step 1412 is normal.

Figure 15:
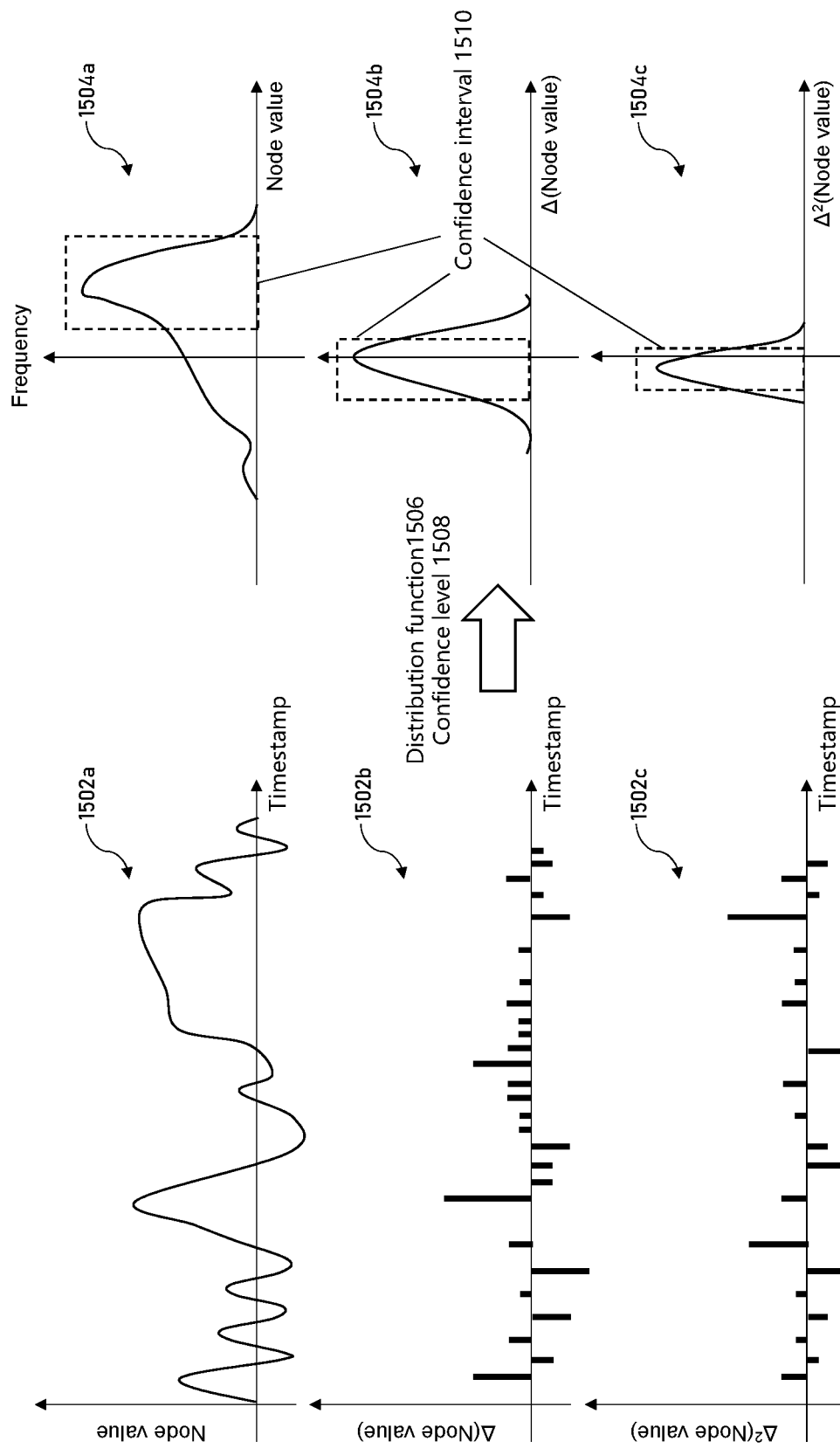
FIG. 15 illustrates an exemplary embodiment of performing a variation control, according to the present disclosure.

FIG. 15 illustrates an exemplary embodiment of performing a variation control. Once the lineage server 110 has established that the data has flown correctly through the system 100, most of the challenges that impact data quality are solved. The remaining part of data quality analysis and control is to ensure that abrupt changes in the node values 304 are captured in time. The variation control as disclosed in the present disclosure tracks large moves in data via 3 different characteristics: the node value 304, the change of the node values 304, and the speed of change of the node values 304 (collectively as the: original, the first and second derivative of the node values 304 with respect to time). Another step forward in the variation control is to introduce historical collection of distributions for each of these descriptors. For each of those distributions no specific thresholds is necessary. Instead, a probability confidence interval can be used to detect outliers. If a node value 304 breaches the interval a flag is raised. In summary, the variation control checks the variation of all node values 304 by looking at the historical values. This is data agnostic and does not have any hard-coded thresholds that need to be breached to report flags. Instead, the thresholds are dynamic and determined from the data itself. For example, in FIG. 15, system 100 tracks the change of the nodes values 304 by generating value graphs 1502a-c. Specifically, value graph 1502a represent a historical record of the node values 304 over time. Value graph 1502b represent a historical record of a first derivative of the node values 304 over time. Value graph 1502b represent a historical record of a second derivative (e.g., a derivative of the first derivative) of the node values 304 over time. System 100 then generates distribution functions 1506 based on the values graphs 1502a-c and uses the distribution functions 1506 to generate distribution graphs 1504a-c. In some embodiments, the distribution function 1506 is a Gaussian function. In alternative embodiments, the distribution function 1506 may be a probability density function or a cumulative density function. Each of the distribution functions 1506 identifies a distribution of probabilities of occurrence for the nodes values 304 in the value graph 1502 within a pre-determined time period. Accordingly, each of the distribution graphs 1504a-c generated based on the distribution function 1506 is a visual representation of the distribution of probabilities of occurrence for the nodes values 304. For example, distribution graphs 1504a is a visual representation of the distribution of probabilities of occurrence for the node values 304. Distribution graphs 1504b is a visual representation of the distribution of probabilities of occurrence for the first derivative of the node values 304. Distribution graphs 1504c is a visual representation of the distribution of probabilities of occurrence for the second derivative of the node values 304.

System 100 may further determine a statistical confidence level 1508 which will be used to determine a probability confidence interval 1510 for a distribution graph 1504. The confidence interval 1510 will be used for determining whether a new node value 304 is an outlier. The statistical confidence level 1508 is a value identifying a probability that a node value 304 falls within a range of values (e.g., confidence interval 1510). The statistical confidence level 1508 may be specified on demand. For example, the statistical confidence level 1508 may be specified as a value, such as for example, 95% or 90%. The statistical confidence interval 1510 that identifies a range of values that a node value 304 may fall in will then be determined based on the specified statistical confidence level 1508. In some embodiments, the statistical confidence interval 1510 is determined based on the distribution function 1506, the specified confidence level 1508, and/or a standard deviation of the node values 304 in a distribution graph 1504. The statistical confidence interval 1510 includes a starting point and an ending point identifying a range of node values 304.

When system 100 receives a new node value 304, system 100 may compare the new node value 304 to the confidence interval 1510 and determines whether the new node value 304 falls within the confidence interval. If the system 100 determines that the new node value 304 falls within the confidence interval, system 100 determines that the new node value 304 is potentially normal or valid. If the system 100 determines that the new node value 304 does not fall within the confidence interval 1510, system 100 determines that the new node value 304 is potentially abnormal or invalid.

Similarly, system 100 may further determine a first derivative of the new node value 304 with respect to time and compare the first derivative to a confidence interval 1510 that is determined for a distribution graph 1504 (e.g., distribution graph 1504b) associated with the first derivatives of node values 304. System 100 may further determine a second derivative of the new node value 304 with respect to time and compare the second derivative to a confidence interval 1510 that is determined for a distribution graph 1504 (e.g., distribution graph 1504c) associated with the second derivatives of node values 304.

In some embodiments, if system 100 determines that the new node value 304, the first derivative of the new node value 304, and the second derivative of the new node value 304 all fall within their respective confidence intervals 1510, the system 100 determines that the new node value 304 is normal or valid. If the system 100 determines that any one of the new node value 304, the first derivative of the new node value 304, and the second derivative of the new node value 304 does not fall within their respective confidence interval 1510, the system 100 determines that new node value 304 is potentially abnormal or invalid.

In alternative embodiments, the statistical confidence interval 1510 may be determined as a range of percentile values associated with the node values 304. When receiving a new node value 304, system 100 may determine a percentile value of the new node value 304 and compare the percentile value to the statistical confidence interval 1510. If the percentile value of the new node value 304 falls within the confidence interval 1510, system 100 determines that the new node value 304 is valid.

Figure 16:
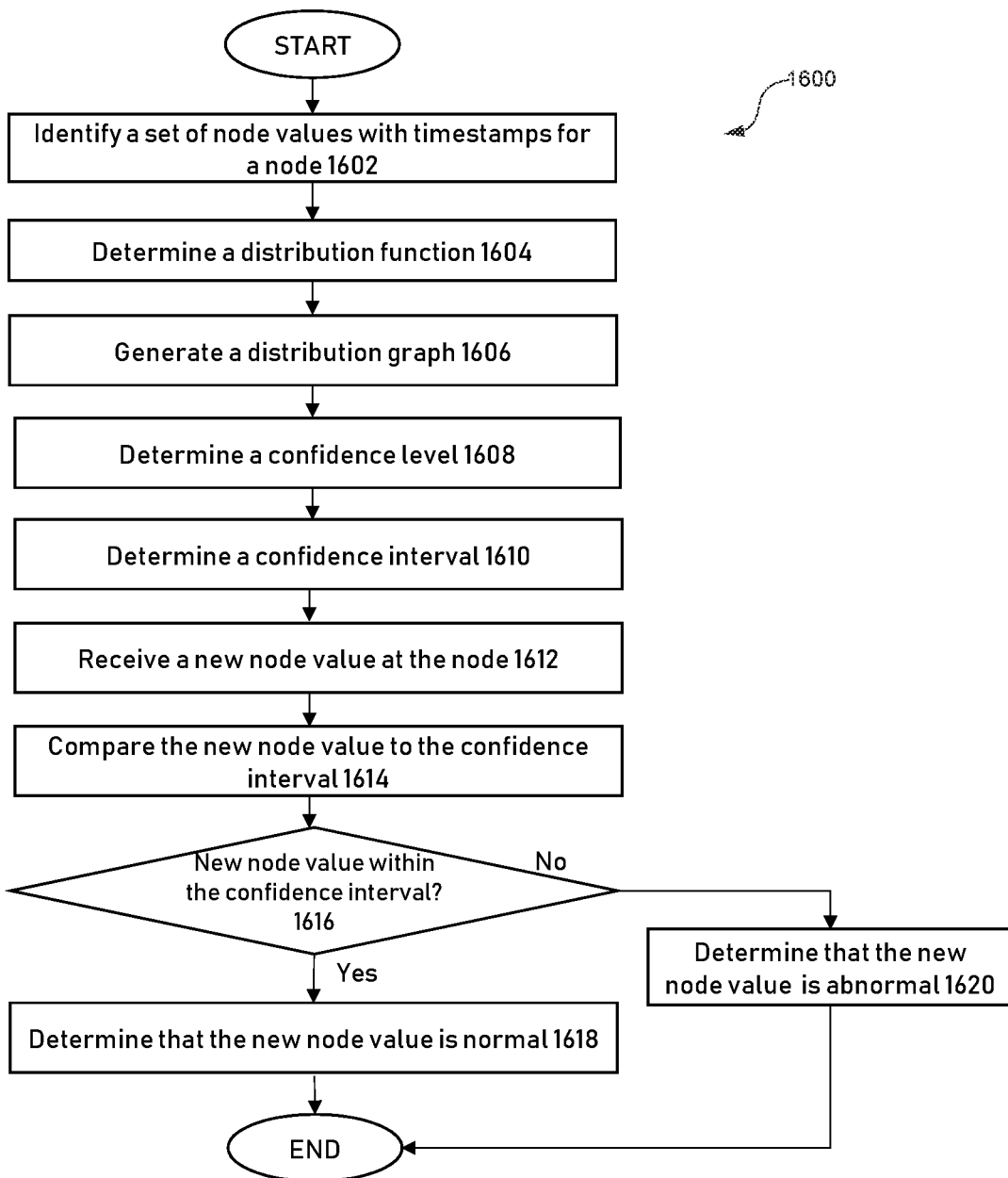
FIG. 16 illustrates an exemplary embodiment of a method of performing a lineage control, according to the present disclosure.

FIG. 16 illustrates an exemplary embodiment of a method 1600 of performing a variation control for network nodes. The following is a non-limiting example that illustrates how system 100 implements method 1600.

Upon starting the process, system 100 identifies a set of nodes value 304 with timestamps 306 for a network node 122 (step 1602). For example, system 100 may retrieve a historical record of the node values 304 for the network node 122 and generate a value graph 1502a. System 100 may further generate a second value graph 1502b for the first derivatives of the node values 304 and a third value graph 1502c for the second derivatives of the node values 304.

At step 1604, system 100 generates a distribution function 1506 based on the value graph 1502 as determined at step 1602. Each of the distribution functions 1506 identifies a distribution of probabilities of occurrence for the nodes values 304 in the value graph 1502 within a pre-determined time period. The distribution function 1506 may be a Gaussian function, a probability density function, or a cumulative density function. For example, system 100 may identify a set of node values 304 in the value graph 1502a that have timestamps 306 within a pre-determined time period. Then, system 100 generate a probability density function for the set of node values 304 such that the probability density function represents a distribution of an occurrence rate (e.g., frequency) of each of the set of node values 304 within the pre-determined time period.

In some embodiments, system 100 may generate a first distribution function 1506 for node values 304 based on the value graph 1502a, a second distribution function 1506 for the first derivative of the node values 304 based on the value graph 1502b, and a third distribution function 1506 for the second derivative of the node values 304 based on the value graph 1502c.

At step 1606, system 100 generates a distribution graph 1504 for the distribution function 1506 as determined at step 1604. The distribution graph 1504 is a visual representation of the distribution of probabilities of occurrence for the node values 304 and/or the derivatives of the node values 304. System 100 may generate a first distribution graph 1504a for node values 304, a second distribution graph 1504b for the first derivatives of the node values 304, and a third distribution graph 1504c for the second derivatives of the node values 304.

At step 1608, system 100 determines a statistical confidence level 1508 for the distribution graph 1504 as determined at step 1606. For example, the statistical confidence level 1508 may be specified as a value, such as for example, 95% or 90%. The statistical confidence level 1508 is a value identifying a probability that a node value 304 falls within a range of values (e.g., statistical confidence interval 1510) and may be used to determine the statistical confidence interval 1510. In some embodiments, system 100 may specify the same or different values for the confidence levels 1508 for the node values 304, the first derivatives of the node values 304, and the second derivatives of the node values 304.

At step 1610, system 100 determines a confidence interval 1510 based on the confidence levels 1508 as specified at step 1608. The statistical confidence interval 1510 identifies a range of values that a node value 304 may fall in with the specified confidence level 1508. In some embodiments, the statistical confidence interval 1510 is determined based on the distribution function 1506, the specified confidence level 1508, and/or a standard deviation of the node values 304 in a distribution graph 1504. The system 100 may determine a first confidence interval 1510 for the node values 304, a second confidence interval 1510 for the first derivatives of the node values 304, and a third confidence interval 1510 for the second derivatives of the node values 304.

At step 1612, system 100 receives a new node value 304 for the network node 122. System may subsequently determine whether the new node value 304 is an outlier in the following steps.

At step 1614, system 100 compares the new node value 304 to the confidence interval 1510 as determined at step 1610. For example, the confidence interval 1510 includes a starting point and an ending point and system 100 may compare the new node value 304 to the starting point and the ending point. Furthermore, system 100 may determine a first derivative of the new node value 304 with respect to time and a second derivative of the new node value 304 with respect to time. System 100 may compare the first derivative and the second derivative of the new node value 304 to their respective confidence intervals 1510.

At step 1616, system 100 determines whether the new node value 304 falls within the confidence interval 1510. If system 100 determines that the new node value 304 falls within the confidence interval 1510, the process 1600 proceeds to step 1618. If system 100 determines that the new node value 304 does not fall within the confidence interval 1510, the process 1600 proceeds to step 1620. Furthermore, system 100 may determine whether the first derivative and the second derivative of the new node value 304 fall within their respective confidence intervals 1510.

At step 1618, system 100 determines that the new node value 304 is normal or valid if the system 100 determines that the new node value 304 falls within the confidence interval 1510. In some embodiments, if system 100 determines that the new node value 304, the first derivative of the new node value 304, and the second derivative of the new node value 304 all fall within their respective confidence intervals 1510, the system 100 determines that the new node value 304 is normal or valid.

At step 1620, system 100 100 determines that the new node value 304 is abnormal or invalid if the system 100 determines that the new node value 304 does not fall within the confidence interval 1510. In some embodiments, if the system 100 determines that any one of the new node value 304, the first derivative of the new node value 304, and the second derivative of the new node value 304 does not fall within their respective confidence interval 1510, the system 100 determines that new node value 304 is potentially abnormal or invalid.

Figure 17A:
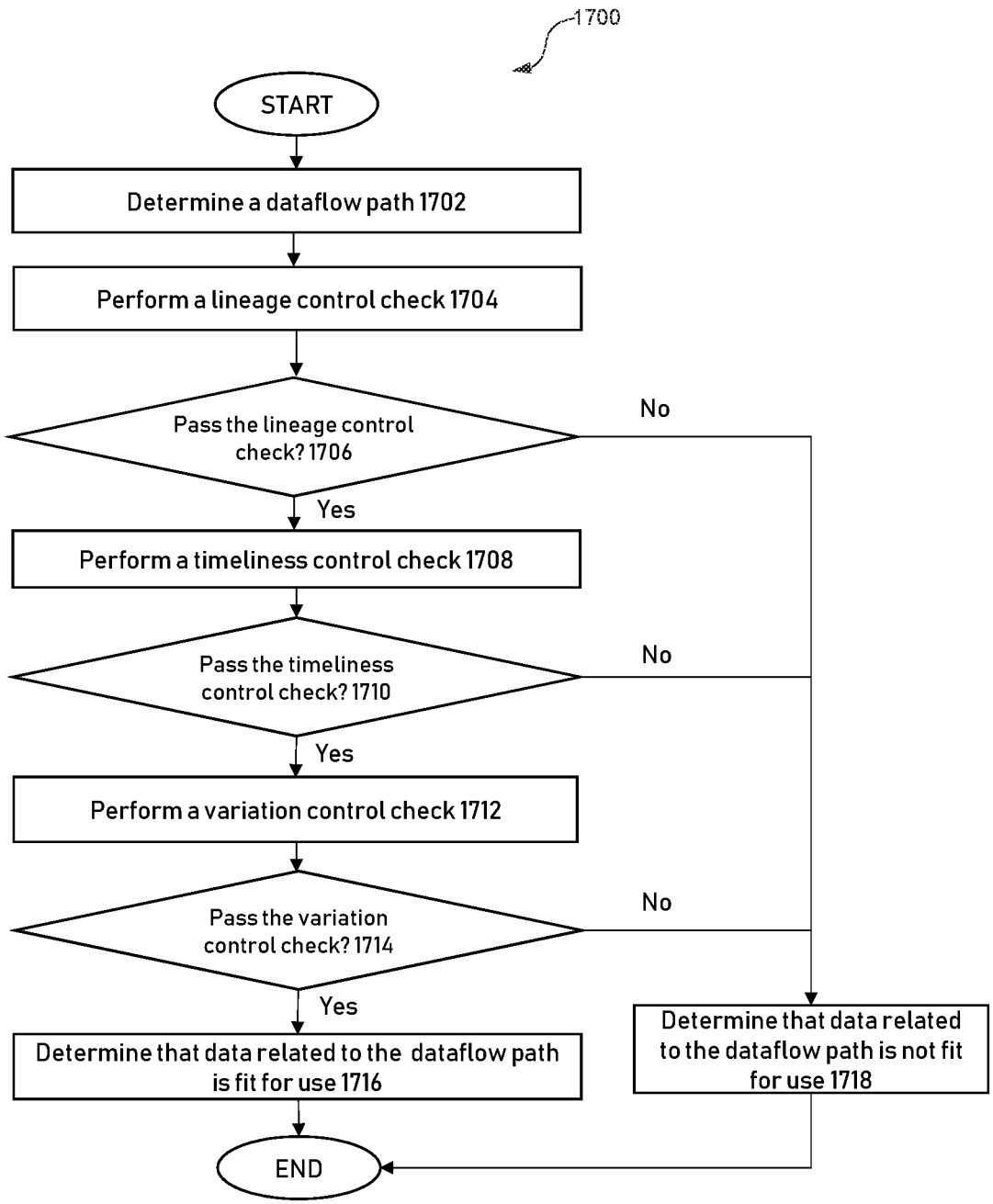
FIG. 17A illustrates an exemplary embodiment of a method of performing a data quality control, according to the present disclosure.

As discussed above, FIGS. 11-12 illustrate embodiments of performing a lineage control of a dataflow. FIGS. 13-14 illustrate embodiments of performing a timeliness control of a dataflow. FIGS. 15-16 illustrate embodiments of performing a variation control of a dataflow. The lineage control, timeliness control, and the variation control may be collectively used for ensuring data quality in system 100. FIG. 17A illustrates an exemplary embodiment of a method 1700 of controlling the data quality of a dataflow. The following is a non-limiting example that illustrates how system 100 implements method 1700.

At step 1702, system 100 determines a dataflow path 500 comprising multiple data storage nodes 122 and one or more computation nodes 130. System 100 further generates an output lineage 116 for the dataflow path 550. The output lineage 116 is generated such that it includes the lineage control values 308 associated with the data storage nodes and the version control values 408 associated with the computation nodes 408.

At step 1704, system 100 performs a lineage control check on the dataflow path 500. For example, system 100 may determine whether a dataflow graph 1104 generated for the dataflow path 500 matches any one of pre-stored dataflow graphs 1102.

At step 1706, system 100 determines whether the dataflow path 500 passes the lineage control check. For example, if system 100 determines that the dataflow graph 1104 generated for the dataflow path 500 matches one of the pre-stored dataflow graphs 1102, system 100 determines that the dataflow path 500 passes the lineage control check. If system 100 determines that the dataflow graph 1104 generated for the dataflow path 500 does not match any one of the pre-stored dataflow graphs 1102, system 100 determines that the dataflow path 500 fails the lineage control check. If system 100 determines that the dataflow path 500 passes the lineage control check, the process 1700 proceeds to step 1708. If system 100 determines that the dataflow path 500 fails the lineage control check, the process 1700 proceeds to step 1718 where system 100 determines that the data related to the dataflow path 500 is not fit for use.

At step 1708, system 100 performs a timeliness control check for the dataflow path 500. For example, system 100 may determine the latencies 1304 between any pair of the nodes in the dataflow path 500. System 100 may compare the latencies 1304 to a predetermined threshold. In some embodiments, system 100 may compare the latencies 1304 against one or more latency distribution graphs 1302.

At step 1710, system 100 determines whether the dataflow path 500 passes the timeliness control check. For example, if system 100 determines the latencies 1304 between any pair of the nodes in the dataflow path 500 is below the pre-determined threshold, system 100 determine that the dataflow path 500 passes the timeliness control check. If system 100 determines the latencies 1304 between one or more pair of the nodes in the dataflow path 500 is equal to or above the pre-determined threshold, system 100 determine that the dataflow path 500 fails the timeliness control check. If system 100 determines that the dataflow path 500 passes the timeliness control check, the process proceeds to step 1712. If system 100 determines that the dataflow path 500 fails the timeliness control check, the process proceeds to step 1718 where system 100 determines that the data related to the dataflow path 500 is not fit for use.

At step 1712, system 100 performs a variation control check for the dataflow path 500. For example, system 100 may determine whether a node value 304, a first derivative of the node value 304 with respect to time, and a second derivative of the node value 304 with respect to time for a node 122 in the dataflow path 500 falls within their respective confidence intervals 1510.

At step 1714, system 100 determines whether the dataflow path 500 passes the variation control check. For example, system 100 may determine whether a node value 304, a first derivative of the node value 304 with respect to time, and a second derivative of the node value 304 with respect to time for each of the nodes 122 in the dataflow path 500 falls within their respective confidence intervals 1510. If system 100 determines that the node value 304, the first derivative of the node value 304 with respect to time, and the second derivative of the node value 304 all falls within their respective confidence intervals 1510, system 100 determines that the dataflow path 500 passes the variation control check. If system 100 determines that any one of the node value 304, the first derivative of the node value 304 with respect to time, and the second derivative of the node value 304 does not fall within their respective confidence intervals 1510, system 100 determines that the dataflow path 500 fails the variation control check. If system 100 determines that the dataflow path 500 passes the variation control check, the process 1700 proceeds to step 1716. If system 100 determines that the dataflow path 500 fails the variation control check, the process 1700 proceeds to step 1718 where system 100 determines that the data related to the dataflow path 500 is not fit for use.

At step 1716, system 100 determines that the data related to the dataflow path 500 is fit for use if system 100 determines that the dataflow path 500 passes the lineage control check, the timeliness control check, and the variation control check.

Figure 17B:
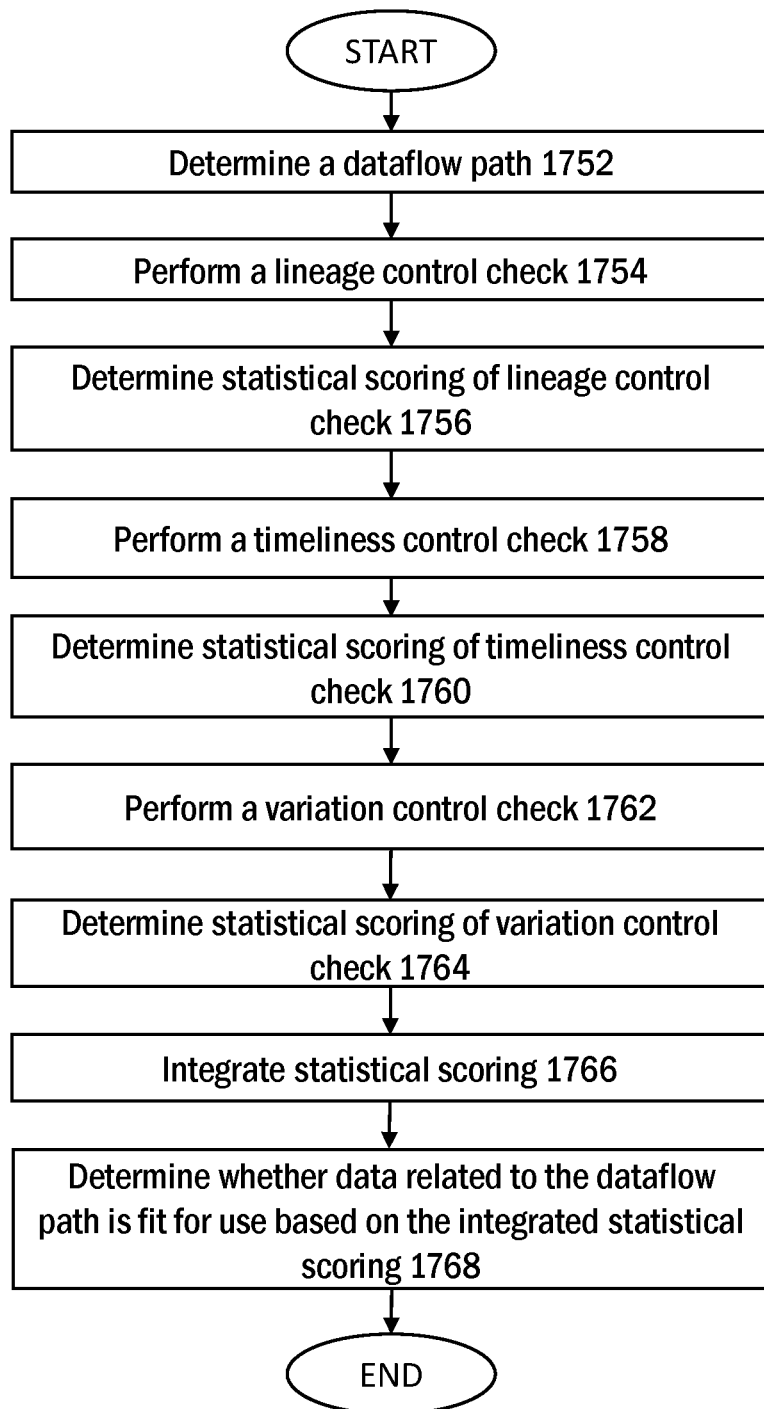
FIG. 17B illustrates another exemplary embodiment of a method of performing a data quality control, according to the present disclosure.

FIG. 17B illustrates an exemplary embodiment of a method 1750 of controlling the data quality of a dataflow. The following is a non-limiting example that illustrates how system 100 implements method 1750.

At step 1752, system 100 determines a dataflow path 500 comprising multiple data storage nodes 122 and one or more computation nodes 130. System 100 further generates an output lineage 116 for the dataflow path 550. The output lineage 116 is generated such that it includes the lineage control values 308 associated with the data storage nodes and the version control values 408 associated with the computation nodes 408.

At step 1754, system 100 performs a lineage control check on the dataflow path 500. For example, system 100 may determine whether a dataflow graph 1104 generated for the dataflow path 500 matches any one of pre-stored dataflow graphs 1102.

At step 1756, system 100 determines a statistical scoring for the lineage control check. For example, if system 100 determines that the dataflow graph 1104 generated for the dataflow path 500 matches one of the pre-stored dataflow graphs 1102, system 100 determines a higher statistical score for the lineage control check. If system 100 determines that the dataflow graph 1104 generated for the dataflow path 500 does not match any one of the pre-stored dataflow graphs 1102, system 100 determines a lower statistical score for the lineage control check.

At step 1758, system 100 performs a timeliness control check for the dataflow path 500. For example, system 100 may determine the latencies 1304 between any pair of the nodes in the dataflow path 500. System 100 may compare the latencies 1304 to a predetermined threshold. In some embodiments, system 100 may compare the latencies 1304 against one or more latency distribution graphs 1302.

At step 1760, system 100 determines a statistical scoring for the timeliness control check. For example, if system 100 determines the latencies 1304 between any pair of the nodes in the dataflow path 500 is below the pre-determined threshold, system 100 determines a higher statistical score for the timeliness control check. If system 100 determines the latencies 1304 between one or more pair of the nodes in the dataflow path 500 is equal to or above the pre-determined threshold, system 100 determines a lower statistical score for the timeliness control check.

At step 1762, system 100 performs a variation control check for the dataflow path 500. For example, system 100 may determine whether a node value 304, a first derivative of the node value 304 with respect to time, and a second derivative of the node value 304 with respect to time for a node 122 in the dataflow path 500 falls within their respective confidence intervals 1510.

At step 1764, system 100 determines a statistical scoring for the variation control check. For example, system 100 may determine whether a node value 304, a first derivative of the node value 304 with respect to time, and a second derivative of the node value 304 with respect to time for each of the nodes 122 in the dataflow path 500 falls within their respective confidence intervals 1510. If system 100 determines that the node value 304, the first derivative of the node value 304 with respect to time, and the second derivative of the node value 304 all falls within their respective confidence intervals 1510, system 100 determines a higher statistical score for the variation control check. If system 100 determines that any one of the node value 304, the first derivative of the node value 304 with respect to time, and the second derivative of the node value 304 does not fall within their respective confidence intervals 1510, system 100 determines a lower statistical score for the variation control check.

At step 1766, system 100 integrates the statistical scores determined at steps 1756 (for lineage control check), 1760 (for timeliness control check), and 1764 (for variation control check) to determine an integrated statistical score for the entire process. The integration of the individual statistical scores can be performed using any suitable algorithms, weighting functions, or other appropriate statistical methods to determine the integrated statistical score for the dataflow path.

At step 1768, system 100 determines whether the data related to the dataflow path is fit for use based on the integrated statistical scoring. For example, system 100 may compare the integrated statistical scoring for the dataflow path against a threshold. For example, if the integrated statistical scoring exceeds the threshold, then the data is determined to be fit for use. If the integrated statistical scoring does not exceed the threshold, then the data is determined not to be fit for use.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for performing a variation control for node values of a network node, comprising:
   a memory configured to store a plurality of node values associated with a network node, each of the node values is associated with a timestamp; and
   one or more processors communicatively coupled to the memory and configured to:
   identify a set of node values that are associated with a set of timestamps within a pre-determined time period;
   determine a distribution function based on the set of node values, the distribution function identifying a distribution of probabilities of occurrence for the set of node values;
   generate a distribution graph for the set of node values based on the distribution function;
   determine a statistical confidence level for the distribution graph, the statistical confidence level identifying a probability that a node value falls within a range of values;
   determine a statistical confidence interval for the distribution graph, the statistical confidence interval identifying a range of values that a node value falls in, the statistical confidence interval being determined based at least in part on the distribution function and the statistical confidence level, the statistical confidence interval comprising a starting point and an ending point;
   receive a new node value for the network node;
   compare the new node value to the starting point and the ending point of the statistical confidence interval; and
   in response to determining that the new node value is between the starting point and the ending point, determine that the new node value is normal.

2. The system of claim 1, wherein the one or more processors are further configured to:
   in response to determining that the new node value is not between the starting point and the ending point, determine that the new node value is an anomaly.

3. The system of claim 1, wherein the distribution function comprises:
   a Gaussian function;
   a probability density function; or
   a cumulative density function.

4. The system of claim 1, wherein the one or more processors are further configured to:
   determine a standard deviation of the set of node values; and
   determine the statistical confidence interval based at least in part on the standard deviation, the distribution function, and the statistical confidence level.

5. The system of claim 1, wherein the one or more processors are further configured to:
   determine a set of derivatives of the set of node values with respect to time;
   determine a second distribution function based on the set of derivatives, the distribution function identifying a distribution of probabilities of occurrence for the set of derivatives;
   generate a second distribution graph for the set of derivatives based on the distribution function;
   determine a second statistical confidence level for the second distribution graph, the second statistical confidence level identifying a probability that a derivative of a node value falls within a range of values;
   determine a second statistical confidence interval for the second distribution graph, the second statistical confidence interval identifying a range of values that a derivative of a node value falls in, the second statistical confidence interval being determined based at least in part on the second distribution function and the second statistical confidence level, the second statistical confidence interval comprising a second starting point and a second ending point;
   determine a derivative of the new node value with respect to time;
   compare the derivative of the new node value to the second starting point and the second ending point of the second statistical confidence interval; and
   in response to determining that the derivative of the new node value is between the second starting point and the second ending point, determine that the derivative of the new node value is normal.

6. The system of claim 5, wherein the one or more processors are further configured to:
   in response to determining that the derivative of the new node value is not between the second starting point and the second ending point, determine that the derivative of the new node value is an anomaly.

7. The system of claim 1, wherein the statistical confidence interval identifies a range of percentile values for the set of node values, wherein the one or more processors are further configured to:
  determine a percentile value of the new node value;
  compare the percentile value of the new node value to the statistical confidence interval; and
  in response to determining that the percentile value of the new node value falls within the statistical confidence interval, determine that the new node value is normal.

8. A non-transitory computer-readable medium comprising a logic for performing a variation control for node values of a network node, the logic, when executed by one or more processors, instructing the one or more processors to:
  store a plurality of node values associated with a network node, each of the node values is associated with a timestamp; and
  identify a set of node values that are associated with a set of timestamps within a pre-determined time period;
  determine a distribution function based on the set of node values, the distribution function identifying a distribution of probabilities of occurrence for the set of node values;
  generate a distribution graph for the set of node values based on the distribution function;
  determine a statistical confidence level for the distribution graph, the statistical confidence level identifying a probability that a node value falls within a range of values;
  determine a statistical confidence interval for the distribution graph, the statistical confidence interval identifying a range of values that a node value falls in, the statistical confidence interval being determined based at least in part on the distribution function and the statistical confidence level, the statistical confidence interval comprising a starting point and an ending point;
  receive a new node value for the network node;
  compare the new node value to the starting point and the ending point of the statistical confidence interval; and
  in response to determining that the new node value is between the starting point and the ending point, determine that the new node value is normal.

9. The non-transitory computer-readable medium of claim 8, wherein the logic further instructs the one or more processors to:
  in response to determining that the new node value is not between the starting point and the ending point, determine that the new node value is an anomaly.

10. The non-transitory computer-readable medium of claim 8, wherein the distribution function comprises:
  a Gaussian function;
  a probability density function; or
  a cumulative density function.

11. The non-transitory computer-readable medium of claim 8, wherein the logic further instructs the one or more processors to:
  determine a standard deviation of the set of node values; and
  determine the statistical confidence interval based at least in part on the standard deviation, the distribution function, and the statistical confidence level.

12. The non-transitory computer-readable medium of claim 8, wherein the logic further instructs the one or more processors to:
  determine a set of derivatives of the set of node values with respect to time;
  determine a second distribution function based on the set of derivatives, the distribution function identifying a distribution of probabilities of occurrence for the set of derivatives;
  generate a second distribution graph for the set of derivatives based on the distribution function;
  determine a second statistical confidence level for the second distribution graph, the second statistical confidence level identifying a probability that a derivative of a node value falls within a range of values;
  determine a second statistical confidence interval for the second distribution graph, the second statistical confidence interval identifying a range of values that a derivative of a node value falls in, the second statistical confidence interval being determined based at least in part on the second distribution function and the second statistical confidence level, the second statistical confidence interval comprising a second starting point and a second ending point;
  determine a derivative of the new node value with respect to time;
  compare the derivative of the new node value to the second starting point and the second ending point of the second statistical confidence interval; and
  in response to determining that the derivative of the new node value is between the second starting point and the second ending point, determine that the derivative of the new node value is normal.

13. The non-transitory computer-readable medium of claim 12, wherein the logic further instructs the one or more processors to:
  in response to determining that the derivative of the new node value is not between the second starting point and the second ending point, determine that the derivative of the new node value is an anomaly.

14. The non-transitory computer-readable medium of claim 8, wherein the statistical confidence interval identifies a range of percentile values for the set of node values, wherein the logic further instructs the one or more processors to:
  determine a percentile value of the new node value;
  compare the percentile value of the new node value to the statistical confidence interval; and
  in response to determining that the percentile value of the new node value falls within the statistical confidence interval, determine that the new node value is normal.

15. A method for performing a variation control for node values of a network node, comprising:
  storing a plurality of node values associated with a network node, each of the node values is associated with a timestamp; and
  identifying a set of node values that are associated with a set of timestamps within a pre-determined time period;
  determining a distribution function based on the set of node values, the distribution function identifying a distribution of probabilities of occurrence for the set of node values;
  generating a distribution graph for the set of node values based on the distribution function;
  determining a statistical confidence level for the distribution graph, the statistical confidence level identifying a probability that a node value falls within a range of values;
  determining a statistical confidence interval for the distribution graph, the statistical confidence interval identifying a range of values that a node value falls in, the statistical confidence interval being determined based at least in part on the distribution function and the statistical confidence level, the statistical confidence interval comprising a starting point and an ending point;

receiving a new node value for the network node;

comparing the new node value to the starting point and the ending point of the statistical confidence interval; and in response to determining that the new node value is between the starting point and the ending point, determining that the new node value is normal.

16. The method of claim 15, wherein the method further comprises:

in response to determining that the new node value is not between the starting point and the ending point, determining that the new node value is an anomaly.

17. The method of claim 15, wherein the method further comprises:

determining a standard deviation of the set of node values; and determining the statistical confidence interval based at least in part on the standard deviation, the distribution function, and the statistical confidence level.

18. The method of claim 15, wherein the method further comprises:

determining a set of derivatives of the set of node values with respect to time;

determining a second distribution function based on the set of derivatives, the distribution function identifying a distribution of probabilities of occurrence for the set of derivatives;

generating a second distribution graph for the set of derivatives based on the distribution function;

determining a second statistical confidence level for the second distribution graph, the second statistical confidence level identifying a probability that a derivative of a node value falls within a range of values;

determining a second statistical confidence interval for the second distribution graph, the second statistical confidence interval identifying a range of values that a derivative of a node value falls in, the second statistical confidence interval being determined based at least in part on the second distribution function and the second statistical confidence level, the second statistical confidence interval comprising a second starting point and a second ending point;

determining a derivative of the new node value with respect to time;

comparing the derivative of the new node value to the second starting point and the second ending point of the second statistical confidence interval; and in response to determining that the derivative of the new node value is between the second starting point and the second ending point, determining that the derivative of the new node value is normal.

19. The method of claim 18, wherein the method further comprises:

in response to determining that the derivative of the new node value is not between the second starting point and the second ending point, determining that the derivative of the new node value is an anomaly.

20. The method of claim 15, wherein the statistical confidence interval identifies a range of percentile values for the set of node values, wherein the method further comprises:

determining a percentile value of the new node value;

comparing the percentile value of the new node value to the statistical confidence interval; and in response to determining that the percentile value of the new node value falls within the statistical confidence interval, determining that the new node value is normal.

* * * * *